US012234990B2

(12) United States Patent
Ito et al.

(10) Patent No.: US 12,234,990 B2
(45) Date of Patent: Feb. 25, 2025

(54) GAS TURBINE COMBUSTION SYSTEM HAVING AN AMMONIA AUTOTHERMAL CRACKING DEVICE

(71) Applicant: IHI Corporation, Tokyo (JP)

(72) Inventors: Shintaro Ito, Tokyo (JP); Masahiro Uchida, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/479,992

(22) Filed: Oct. 3, 2023

(65) Prior Publication Data

US 2024/0026814 A1 Jan. 25, 2024

Related U.S. Application Data

(63) Continuation of application No. PCT/JP2022/011895, filed on Mar. 16, 2022.

(30) Foreign Application Priority Data

Apr. 14, 2021 (JP) .................................. 2021-068650

(51) Int. Cl.
| | | |
|---|---|---|
| F23R 3/40 | (2006.01) | |
| F02C 3/22 | (2006.01) | |
| F02C 3/24 | (2006.01) | |
| F02C 7/22 | (2006.01) | |
| F23R 3/28 | (2006.01) | |

(52) U.S. Cl.
CPC .................. *F23R 3/40* (2013.01); *F02C 3/24* (2013.01); *F02C 7/22* (2013.01); *F02C 3/22* (2013.01); *F23R 3/286* (2013.01)

(58) Field of Classification Search
CPC ...... F02C 3/22; F02C 3/24; F02C 7/22; F02C 7/224; F23R 3/40
See application file for complete search history.

(56) References Cited

U.S. PATENT DOCUMENTS

| | | | | |
|---|---|---|---|---|
| 2012/0047870 A1* | 3/2012 | Kasuga | ..................... | F02C 3/28 60/39.462 |
| 2020/0032676 A1* | 1/2020 | Nose | ......................... | F23R 3/36 |
| 2022/0162999 A1* | 5/2022 | Cocks | ...................... | F02C 3/22 |
| 2022/0364505 A1* | 11/2022 | Kim | ......................... | F02C 7/22 |
| 2024/0019124 A1* | 1/2024 | Ito | ............................. | F02C 3/24 |
| 2024/0093639 A1* | 3/2024 | Ikeda | ........................ | F02C 3/28 |

FOREIGN PATENT DOCUMENTS

| | | |
|---|---|---|
| CN | 107100736 A | 8/2017 |
| JP | H04-342829 A | 11/1992 |
| JP | 2012-255420 A | 12/2012 |
| JP | 2016-191507 A | 11/2016 |
| JP | 2018-076214 A | 5/2018 |
| JP | 6720244 B2 | 7/2020 |
| JP | 2020-147478 A | 9/2020 |
| JP | 6769856 B2 | 10/2020 |

\* cited by examiner

*Primary Examiner* — William H Rodriguez
(74) *Attorney, Agent, or Firm* — Rothwell, Figg, Ernst & Manbeck, P.C.

(57) ABSTRACT

A combustion device includes: an ammonia tank; a combustor connected to the ammonia tank; an air supply source; and an ammonia autothermal cracking device having inlets connected to the ammonia tank and the air supply source and an outlet connected to the combustor.

16 Claims, 14 Drawing Sheets

GAS TURBINE COMBUSTION SYSTEM HAVING AN AMMONIA AUTOTHERMAL CRACKING DEVICE

CROSS REFERENCE TO RELATED APPLICATIONS

This application is a continuation application of International Application No. PCT/JP2022/011895, filed on Mar. 16, 2022, which claims priority to Japanese Patent Application No. 2021-068650, filed on Apr. 14, 2021, the entire contents of which are incorporated by reference herein.

BACKGROUND ART

Technical Field

The present disclosure relates to a combustion device and a gas turbine system. This application claims the benefit of priority to Japanese Patent Application No. 2021-068650 filed on Apr. 14, 2021, and contents thereof are incorporated herein.

Related Art

A gas turbine system that combusts fuel in a combustor to obtain power has been used. As the gas turbine system, for example, there exists a gas turbine system that uses ammonia as fuel, as disclosed in Patent Literature 1. Emission of carbon dioxide is suppressed by using ammonia as fuel.

CITATION LIST

Patent Literature

Patent Literature 1: JP 2016-191507 A

SUMMARY

Technical Problem

Ammonia is less combustible than other fuels and has flame retardancy. Thus, in the combustor in which ammonia is used as fuel, ignition fails in some cases. Further, even when ignition is successfully performed, part of the fuel may be discharged without being combusted.

An object of the present disclosure is to provide a combustion device and a gas turbine system which are capable of improving combustibility in a combustor in which ammonia is used as fuel.

Solution to Problem

In order to solve the above-mentioned problem, according to the present disclosure, there is provided a combustion device including: an ammonia tank; a combustor connected to the ammonia tank; an air supply source; and an ammonia autothermal cracking device having inlets connected to the ammonia tank and the air supply source and an outlet connected to the combustor.

The combustion device may further include: an intake flow passage and an exhaust flow passage, each being connected to the combustor; and an ammonia cracking catalyst, which is provided in the intake flow passage or the exhaust flow passage and is connected to the ammonia tank and the combustor.

A mixer may be provided in a flow passage that connects the ammonia autothermal cracking device and the combustor, and the mixer may be connected to the ammonia tank.

A first heat exchanger may be provided in a flow passage that connects the ammonia autothermal cracking device and the combustor to each other, and a flow passage that connects the ammonia tank and the ammonia autothermal cracking device to each other may include a first flow passage that passes through the first heat exchanger.

The flow passage that connects the ammonia tank and the ammonia autothermal cracking device to each other may further include a second flow passage that bypasses the first heat exchanger.

The first flow passage may branch into a first branch passage and a second branch passage on a side closer to the ammonia autothermal cracking device with respect to the first heat exchanger, and the first flow passage and the second branch passage may be connected to the inlets of the ammonia autothermal cracking device, respectively.

The ammonia tank may be connected to the inlet of the ammonia autothermal cracking device through intermediation of the air supply source.

A second heat exchanger may be provided in the air supply source, and a flow passage that connects the ammonia tank and the ammonia autothermal cracking device to each other may pass through the second heat exchanger.

The air supply source may be connected to the inlet of the ammonia autothermal cracking device through intermediation of an air tank.

In order to solve the above-mentioned problem, according to the present disclosure, there is provided a gas turbine system including the above-mentioned combustion device.

Effects of Disclosure

According to the present disclosure, it is possible to improve combustibility in the combustor in which ammonia is used as fuel.

DESCRIPTION OF EMBODIMENTS

Figure 1:
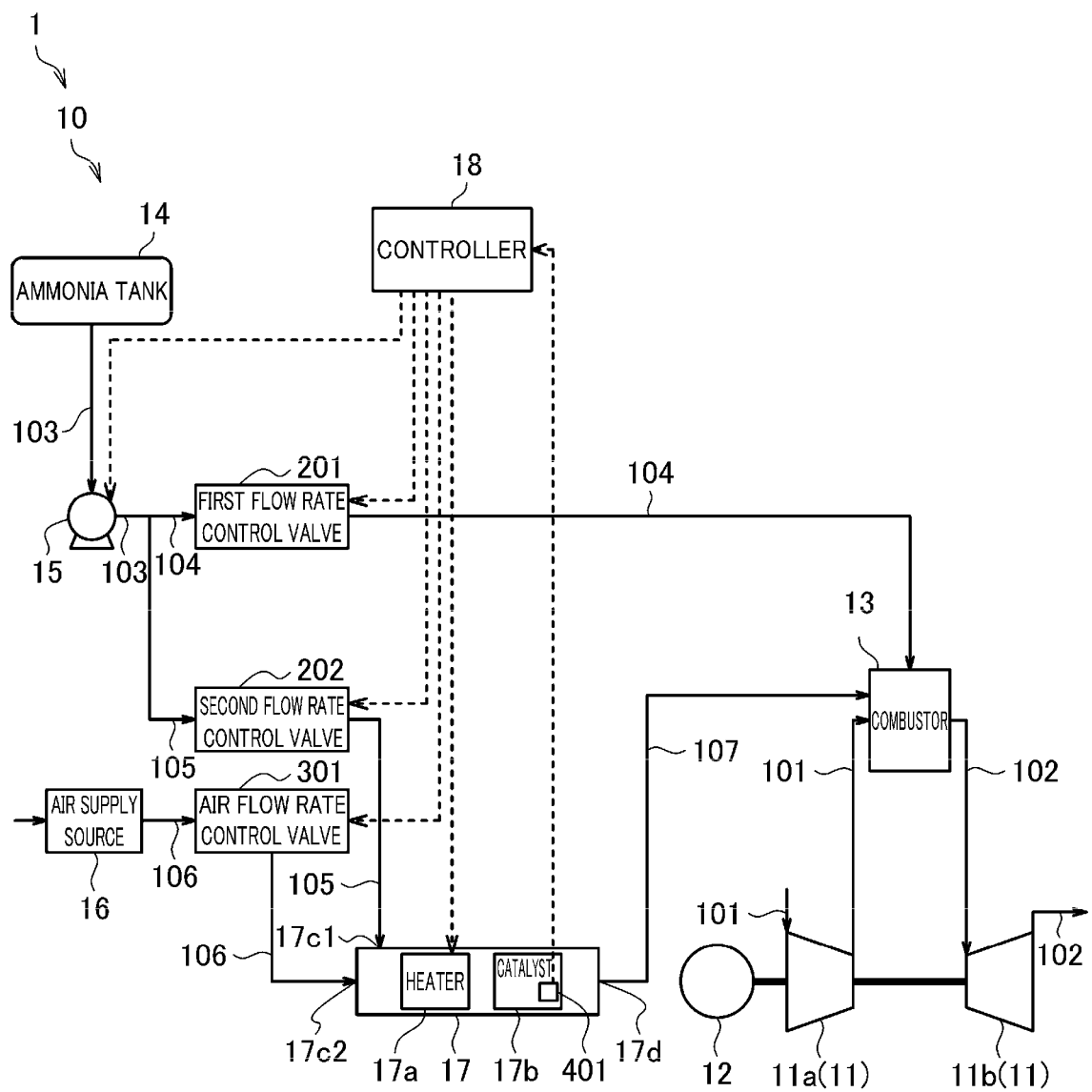
FIG. 1 is a schematic view for illustrating a configuration of a gas turbine system according to an embodiment of the present disclosure.

Now, with reference to the attached drawings, an embodiment of the present disclosure is described. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic view for illustrating a configuration of a gas turbine system 1 according to this embodiment. As illustrated in FIG. 1, the gas turbine system 1 includes a turbocharger 11, a power generator 12, a combustor 13, an ammonia tank 14, a pump 15, an air supply source 16, an ammonia autothermal cracking device 17, and a controller 18.

The combustor 13, the ammonia tank 14, the pump 15, the air supply source 16, the ammonia autothermal cracking device 17, and the controller 18 of the gas turbine system 1 are included in a combustion device 10. A first flow rate control valve 201, a second flow rate control valve 202, and an air flow rate control valve 301, which are described later, are also included in the combustion device 10.

The turbocharger 11 includes a compressor 11a and a turbine 11b. The compressor 11a and the turbine 11b rotate integrally. The compressor 11a and the turbine 11b are coupled to each other through intermediation of a shaft.

The compressor 11a is provided in an intake flow passage 101 connected to the combustor 13. Air to be supplied to the combustor 13 flows through the intake flow passage 101. An intake port (not shown) is formed at an upstream-side end portion of the intake flow passage 101. The intake port allows air to be introduced from an outside. The air introduced through the intake port passes through the compressor 11a and is sent to the combustor 13. The compressor 11a compresses the air and discharges the compressed air to a downstream side.

The turbine 11b is provided in an exhaust flow passage 102 connected to the combustor 13. An exhaust gas discharged from the combustor 13 flows through the exhaust flow passage 102. An exhaust port (not shown) is formed at a downstream-side end portion of the exhaust flow passage 102. The exhaust port allows the exhaust gas to be discharged to the outside. The exhaust gas discharged from the combustor 13 passes through the turbine 11b and is sent to the exhaust port. The turbine 11b is rotated by the exhaust gas to generate rotational power.

The power generator 12 is connected to the turbocharger 11. The power generator 12 generates electric power with use of the rotational power generated by the turbocharger 11.

In the combustor 13, ammonia is mainly used as fuel to cause combustion. As described later, for example, at the time of activation of the gas turbine system 1, a cracked gas supplied from the ammonia autothermal cracking device 17 is also used as fuel.

The combustor 13 includes a combustion chamber (not shown). The air compressed by the compressor 11a is supplied to the combustion chamber of the combustor 13 through the intake flow passage 101. Fuel is supplied to the combustion chamber of the combustor 13. For example, liquid ammonia is supplied as fuel from the ammonia tank 14 and is sprayed into the combustion chamber of the combustor 13. An air-fuel mixture containing fuel and air is generated in the combustion chamber of the combustor 13. An exhaust gas generated as a result of combustion in the combustion chamber of the combustor 13 is discharged to the exhaust flow passage 102.

The liquid ammonia is stored in the ammonia tank 14. The ammonia tank 14 is connected to each of the combustor 13 and the ammonia autothermal cracking device 17. In this manner, ammonia can be supplied from the ammonia tank 14 to each of the combustor 13 and the ammonia autothermal cracking device 17.

A flow passage 103 is connected to the ammonia tank 14. A flow passage 104 and a flow passage 105 are connected to a downstream-side end portion of the flow passage 103. The flow passage 104 is connected to the combustor 13. That is, the ammonia tank 14 is connected to the combustor 13 through intermediation of the flow passage 103 and the flow passage 104. The liquid ammonia is supplied from the ammonia tank 14 to the combustion chamber of the combustor 13 via the flow passage 103 and the flow passage 104. The flow passage 105 is connected to the ammonia autothermal cracking device 17. That is, the ammonia tank 14 is connected to the ammonia autothermal cracking device 17 through intermediation of the flow passage 103 and the flow passage 105. The liquid ammonia is supplied from the ammonia tank 14 to the ammonia autothermal cracking device 17 via the flow passage 103 and the flow passage 105.

The pump 15 is provided in the flow passage 103. The pump 15 feeds the ammonia supplied from the ammonia tank 14 to a downstream side. The ammonia fed by the pump 15 passes through the flow passage 103 and is sent to the flow passage 104 and the flow passage 105.

The first flow rate control valve 201 is provided in the flow passage 104. The first flow rate control valve 201 controls a flow rate of ammonia flowing through the flow passage 104. Specifically, the first flow rate control valve 201 adjusts a supply amount of ammonia from the ammonia tank 14 to the combustor 13. The supply amount of ammonia from the ammonia tank 14 to the combustor 13 is adjusted through adjustment of an opening degree of the first flow rate control valve 201.

The second flow rate control valve 202 is provided in the flow passage 105. The second flow rate control valve 202 controls a flow rate of ammonia flowing through the flow passage 105. Specifically, the second flow rate control valve 202 adjusts a supply amount of ammonia from the ammonia tank 14 to the ammonia autothermal cracking device 17. The supply amount of ammonia from the ammonia tank 14 to the ammonia autothermal cracking device 17 is adjusted through adjustment of an opening degree of the second flow rate control valve 202.

The air supply source 16 is a supply source that supplies air. The air supply source 16 is, for example, a compressor that compresses and discharges outside air. The air supply source 16 is connected to the ammonia autothermal cracking device 17 through intermediation of a flow passage 106. Air is supplied from the air supply source 16 to the ammonia autothermal cracking device 17 via the flow passage 16.

The air flow rate control valve 301 is provided in the flow passage 106. The air flow rate control valve 301 controls a flow rate of air flowing through the flow passage 106. Specifically, the air flow rate control valve 301 adjusts a supply amount of air from the air supply source 16 to the ammonia autothermal cracking device 17. The supply amount of air from the air supply source 16 to the ammonia autothermal cracking device 17 is adjusted through adjustment of an opening degree of the air flow rate control valve 301.

The ammonia autothermal cracking device 17 combusts part of ammonia and cracks the remaining ammonia with heat generated by the combustion. The ammonia autothermal cracking device 17 is also called "autothermal reactor". The ammonia autothermal cracking device 17 includes a heater 17a and a catalyst 17b. The heater 17a heats an inside of the ammonia autothermal cracking device 17. The catalyst 17b promotes the combustion and the cracking of ammonia. A temperature sensor 401 that detects a temperature of the catalyst 17b is provided in the ammonia autothermal cracking device 17. The ammonia tank 14 is connected to an inlet 17c1 of the ammonia autothermal cracking device 17 through intermediation of the flow passage 105. The air supply source 16 is connected to an inlet 17c2 of the ammonia autothermal cracking device 17 through intermediation of the flow passage 106. The combustor 13 is connected to an outlet 17d of the ammonia autothermal cracking device 17 through intermediation of a flow passage 107.

Ammonia is supplied into the ammonia autothermal cracking device 17 via the inlet 17c1. A nozzle that sprays liquid ammonia is provided at the inlet 17c1. Ammonia is sprayed from the nozzle into the ammonia autothermal cracking device 17. Air is supplied into the ammonia autothermal cracking device 17 via the inlet 17c2. The ammonia and the air that are supplied into the ammonia autothermal cracking device 17 are heated by the heater 17a. Thus, the ammonia is vaporized. Then, part of the ammonia is combusted in the catalyst 17b. The remaining ammonia is cracked into hydrogen and nitrogen by heat generated at this time.

A cracked gas generated as a result of the cracking of ammonia contains hydrogen and nitrogen. The cracked gas generated in the ammonia autothermal cracking device 17 is discharged from the outlet 17d of the ammonia autothermal cracking device 17. The cracked gas discharged from the outlet 17d is sent to the combustion chamber of the combustor 13 through the flow passage 107. The cracked gas may contain not only hydrogen and nitrogen but also, for example, uncracked ammonia.

The controller 18 includes, for example, a central processing unit (CPU), a ROM that stores, for example, a program, and a RAM serving as a work area. The controller 18 controls the whole gas turbine system 1. For example, the controller 18 controls the pump 15, the heater 17a, the first flow rate control valve 201, the second flow rate control valve 202, and the air flow rate control valve 301. Further, the controller 18 acquires a detection result from the temperature sensor 401.

Figure 2:
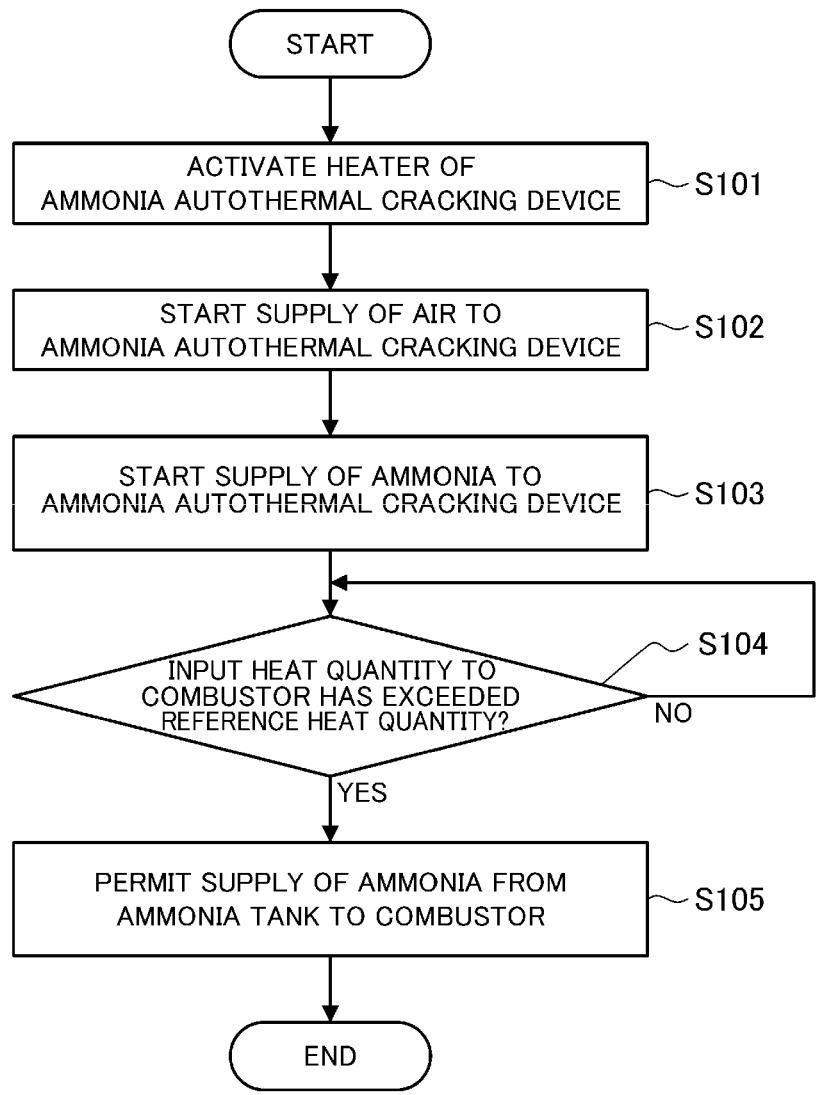
FIG. 2 is a flowchart for illustrating one example of flow of processing associated with activation of the gas turbine system according to the embodiment of the present disclosure.

FIG. 2 is a flowchart for illustrating one example of flow of processing associated with activation of the gas turbine system 1. The processing flow illustrated in FIG. 2 is performed by the controller 18. The processing flow illustrated in FIG. 2 is executed when an activation condition for the gas turbine system 1 is satisfied. The activation condition is that, for example, an input operation for activating the gas turbine system 1 is performed by a user.

When the processing flow illustrated in FIG. 2 starts, the controller 18 activates the heater 17a of the ammonia autothermal cracking device 17 in Step S101. Next, in Step S102, the controller 18 starts the supply of air to the ammonia autothermal cracking device 17. Specifically, the controller 18 opens the air flow rate control valve 301 that is in a closed state. Next, in Step S103, the controller 18 starts the supply of ammonia to the ammonia autothermal cracking device 17. Specifically, the controller 18 drives the pump 15 and opens the second flow rate control valve 202 that is in a closed state.

When ammonia and air are supplied to the ammonia autothermal cracking device 17 as described above, the cracked gas is generated in the ammonia autothermal cracking device 17. Then, the generated cracked gas is sent to the combustor 13. Ignition is performed by an ignition device (not shown) in the combustor 13. As described above, at the time of activation of the gas turbine system 1, ignition is performed under a state in which the cracked gas is supplied to the combustor 13. Specifically, the cracked gas is used as fuel for ignition. Unlike ammonia, hydrogen contained in the cracked gas is combustible and thus is more likely to be ignited. Hence, a failure in ignition is suppressed, and reliability of ignition is improved.

Next, in Step S104, the controller 18 determines whether or not an input heat quantity to the combustor 13 has exceeded a reference heat quantity. The input heat quantity to the combustor 13 is a heat quantity generated as a result of combustion of fuel input to the combustor 13. The controller 18 can estimate the input heat quantity to the combustor 13 based on, for example, a supply amount of fuel to the combustor 13. The reference heat quantity is set to a value around which combustibility in the combustor 13 is maintained to a predetermined level or higher even after the supply of ammonia to the combustor 13 is started. The predetermined level is a level around which occurrence of non-combustion of part of ammonia is suppressed.

When it is determined that the input heat quantity to the combustor 13 has exceeded the reference heat quantity (YES in Step S104), the controller 18 determines that the combustibility in the combustor 13 is maintained to the predetermined level or higher even after the supply of ammonia to the combustor 13 is started. Then, the processing proceeds to Step S105. Meanwhile, when it is determined that the input heat quantity to the combustor 13 has not exceeded the reference heat quantity (NO in Step S104), the controller 18 determines that the combustibility in the combustor 13 decreases to be below the predetermined level after the supply of ammonia to the combustor 13 is started. Then, the processing in Step S104 is repeated.

When it is determined as YES in Step S104, the controller 18 permits the supply of ammonia from the ammonia tank 14 to the combustor 13 in Step S105. Then, the processing flow illustrated in FIG. 2 ends. In Step S105, specifically, when a required output for the gas turbine system 1 is equal to or larger than a reference output, the controller 18 starts the supply of ammonia from the ammonia tank 14 to the combustor 13. In this case, the controller 18 opens the first flow rate control valve 201 that is in a closed state. As a result, combustion using ammonia as fuel is started. When the required output for the gas turbine system 1 is smaller than the reference output, the supply of ammonia from the ammonia tank 14 to the combustor 13 is not required.

In the gas turbine system 1, the combustion using ammonia as fuel is started under a state in which the cracked gas is supplied to the combustor 13 and the combustibility is maintained at the predetermined level or higher. Specifically, the cracked gas is used as fuel for combustion aid. As a result, occurrence of non-combustion of part of ammonia is suppressed. After the supply of ammonia to the combustor 13 is started, the controller 18 may continue or stop the supply of the cracked gas to the combustor 13. When the supply of the cracked gas to the combustor 13 is stopped, the controller 18 stops the heater 17a and stops the supply of air and ammonia to the ammonia autothermal cracking device 17.

When a balance between an endothermic reaction and an exothermic reaction is achieved in the ammonia autothermal cracking device 17 and a state in the ammonia autothermal cracking device 17 has become close to a thermal equilibrium state, the controller 18 may stop the heater 17a. A reaction in which ammonia is cracked corresponds to the endothermic reaction. A reaction in which ammonia is combusted corresponds to the exothermic reaction. For example, when a temperature of the catalyst 17b reaches a predetermined temperature, the controller 18 may determine that the state in the ammonia autothermal cracking device 17 has become close to a thermal equilibrium state and may stop the heater 17a.

As described above, in the gas turbine system 1, the inlets 17c1 and 17c2 of the ammonia autothermal cracking device 17 are connected to the ammonia tank 14 and the air supply source 16, respectively. The outlet 17d of the ammonia autothermal cracking device 17 is connected to the combustor 13. Thus, at the time of activation of the gas turbine system 1, ammonia and air are supplied to the ammonia autothermal cracking device 17 to thereby allow the ammonia autothermal cracking device 17 to generate a cracked gas. As a result, ignition can be performed by using the cracked gas in the combustor 13. Hence, an ignition failure can be suppressed to thereby improve reliability of the ignition. Further, after the ignition is performed, the cracked gas can be used as fuel for combustion aid. Thus, combustibility in the combustor 13 can be improved.

In particular, in the gas turbine system 1, the cracked gas can be generated by using the ammonia autothermal cracking device 17. Thus, in comparison to a case in which a cracked gas is generated by another method, the gas turbine system 1 can be quickly activated. An example of another method includes, for example, as described later with reference to FIG. 3 or FIG. 5, a method of generating a cracked gas by supplying ammonia to an ammonia cracking catalyst 19 provided in the intake flow passage 101 or the exhaust flow passage 102. If the cracked gas generated by the above-mentioned method is supplied to the combustor 13 at the time of activation of the gas turbine system 1, the ammonia cracking catalyst 19 is required to be heated to a temperature around which the cracking of ammonia actively occurs. Thus, long time is required to start the generation of the cracked gas. Meanwhile, in this embodiment, the ammonia is cracked by using the heat generated as a result of the combustion of part of ammonia in the ammonia autothermal cracking device 17. Hence, time required to start the generation of the cracked gas can be reduced, and thus the gas turbine system 1 can be quickly activated.

Now, with reference to FIG. 3 to FIG. 14, gas turbine systems according to modification examples are described.

Figure 3:
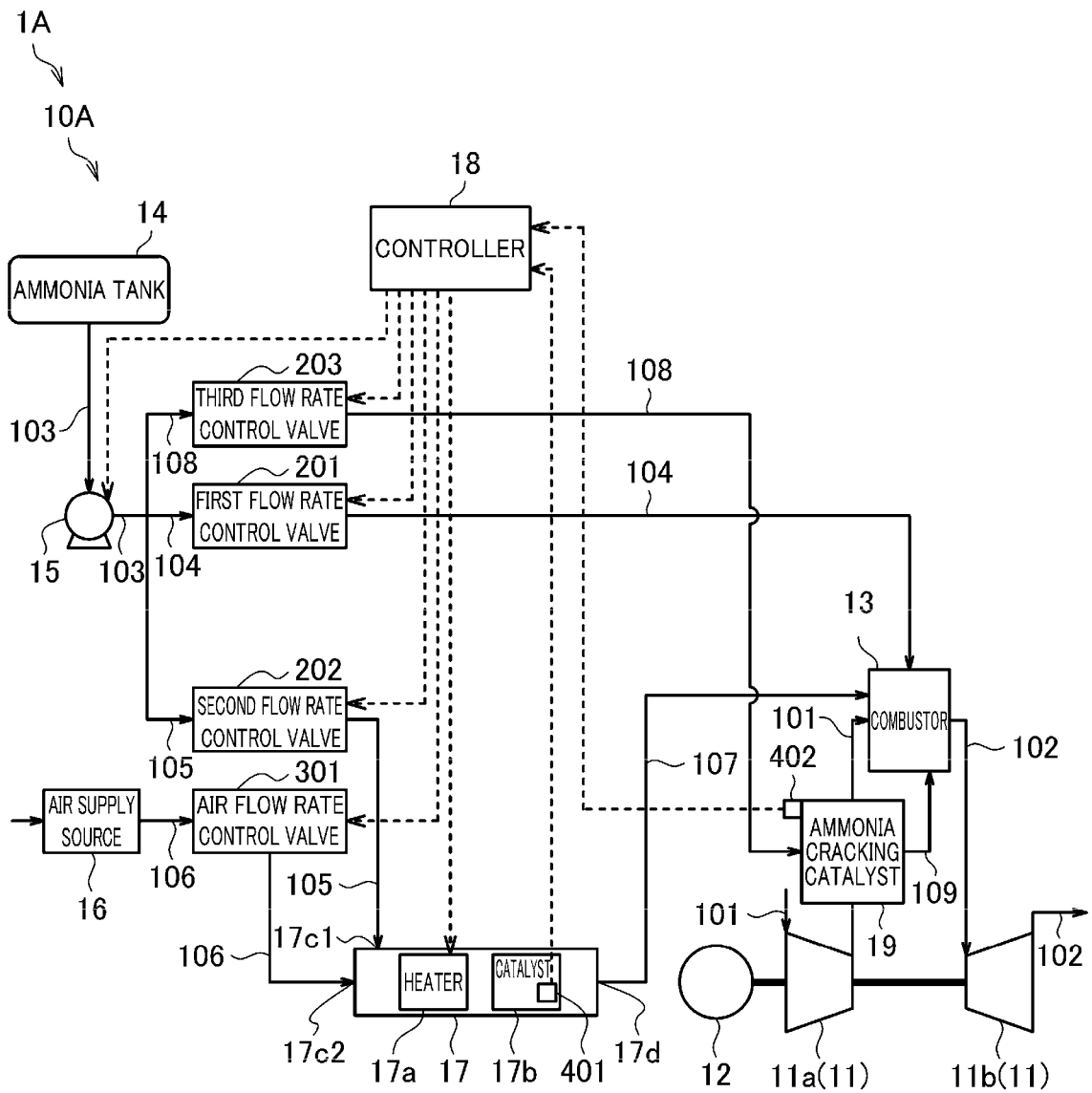
FIG. 3 is a schematic view for illustrating a configuration of a gas turbine system according to a first modification example.

FIG. 3 is a schematic view for illustrating a configuration of a gas turbine system 1A according to a first modification example. As illustrated in FIG. 3, the gas turbine system 1A according to the first modification example is different from the gas turbine system 1 described above in that an ammonia cracking catalyst 19 is further provided.

In the first modification example, a combustor 13, an ammonia tank 14, a pump 15, an air supply source 16, an ammonia autothermal cracking device 17, a controller 18, the ammonia cracking catalyst 19, a first flow rate control valve 201, a second flow rate control valve 202, and an air flow rate control valve 301 of the gas turbine system 1A are included in a combustion device 10A. A third flow rate control valve 203, which is described later, is also included in the combustion device 10A.

The ammonia cracking catalyst 19 cracks ammonia and generates a cracked gas. The ammonia cracking catalyst 19 cracks ammonia into hydrogen and nitrogen. Specifically, the cracked gas contains hydrogen and nitrogen. The cracked gas may contain uncracked ammonia in addition to hydrogen and nitrogen.

The ammonia cracking catalyst 19 is connected to the ammonia tank 14 through intermediation of a flow passage 103 and a flow passage 108. The flow passage 108 is connected to a downstream-side end portion of the flow passage 103. Liquid ammonia is supplied from the ammonia tank 14 to the ammonia cracking catalyst 19 via the flow passage 103 and the flow passage 108.

The third flow rate control valve 203 is provided in the flow passage 108. The third flow rate control valve 203 controls a flow rate of ammonia flowing through the flow passage 108. Specifically, the third flow rate control valve 203 adjusts a supply amount of ammonia from the ammonia tank 14 to the ammonia cracking catalyst 19. The supply amount of ammonia from the ammonia tank 14 to the ammonia cracking catalyst 19 is adjusted through adjustment of an opening degree of the third flow rate control valve 203.

The ammonia cracking catalyst 19 is connected to the combustor 13 through intermediation of a flow passage 109. A cracked gas generated from the ammonia cracking catalyst 19 is sent to a combustion chamber of the combustor 13 through the flow passage 109.

The cracking of ammonia with the ammonia cracking catalyst 19 actively occurs when a temperature of the ammonia cracking catalyst 19 is equal to or higher than a reference temperature (for example, from about 400° C. to about 500° C.) Specifically, when the temperature of the ammonia cracking catalyst 19 becomes equal to or higher than the reference temperature, the cracking of ammonia can actively occur with the ammonia cracking catalyst 19.

The ammonia cracking catalyst 19 is provided in an intake flow passage 101. More specifically, the ammonia cracking catalyst 19 is provided on a downstream side of a compressor 11a in the intake flow passage 101. The ammonia cracking catalyst 19 and air in the intake flow passage 101 can exchange heat under a state in which an internal space of the ammonia cracking catalyst 19 and the intake flow passage 101 are not in communication with each other. Air flowing on a downstream side of the compressor 11a in the intake flow passage 101 has been compressed by the compressor 11a, and thus has a high temperature (for example, 400° C. or higher). Hence, the ammonia cracking catalyst 19 is heated with the air flowing through the intake flow passage 101 to a temperature around which the cracking of ammonia actively occurs during an operation of the gas turbine system 1A.

A temperature sensor 402 is provided to the ammonia cracking catalyst 19. The temperature sensor 402 detects a temperature of the ammonia cracking catalyst 19.

Figure 4:
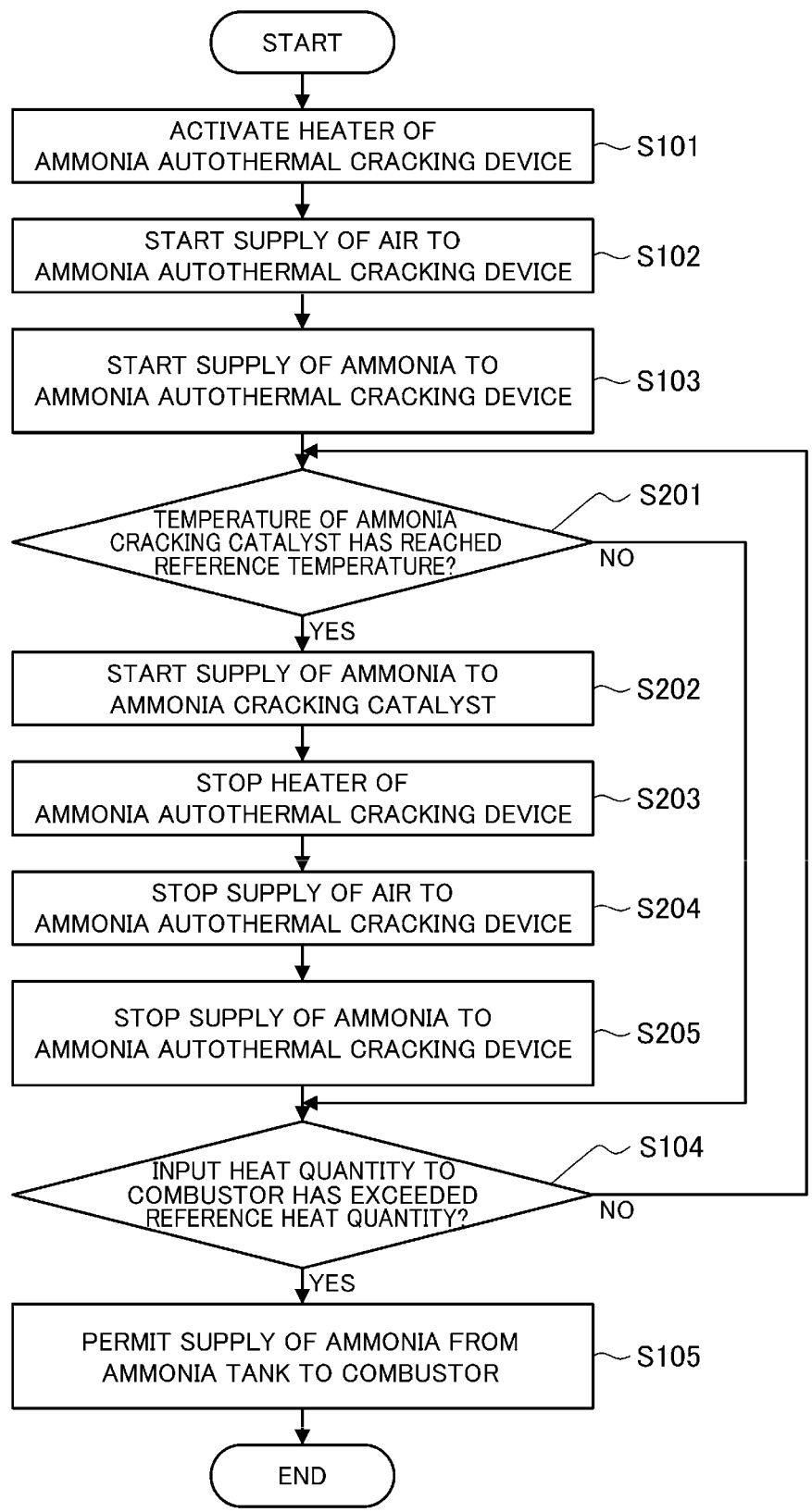
FIG. 4 is a flowchart for illustrating one example of flow of processing associated with activation of the gas turbine system according to the first modification example.

FIG. 4 is a flowchart for illustrating one example of flow of processing associated with activation of the gas turbine system 1A. The processing flow illustrated in FIG. 4 is performed by the controller 18. As in the processing flow illustrated in FIG. 2, the processing flow illustrated in FIG. 4 is executed when an activation condition for the gas turbine system 1A is satisfied.

The processing flow illustrated in FIG. 4 is different from the processing flow illustrated in FIG. 2 in that Steps S201, S202, S203, S204, and S205 are added between Step S103 and Step S104.

In the processing flow illustrated in FIG. 4, in Step S201 subsequent to Step S103, the controller 18 determines whether or not a temperature of the ammonia cracking catalyst 19 has reached the reference temperature. When it is determined that the temperature of the ammonia cracking catalyst 19 has reached the reference temperature (YES in Step S201), the processing proceeds to Step S202. Meanwhile, when it is determined that the temperature of the ammonia cracking catalyst 19 has not reached the reference temperature (NO in Step S201), Steps S202, S203, S204, and S205 are skipped and the processing proceeds to Step S104.

When it is determined as YES in Step S201, the controller 18 starts the supply of ammonia to the ammonia cracking catalyst 19 in Step S202. Specifically, the controller 18 opens the third flow rate control valve 203 that is in a closed state. As a result, when ammonia is cracked with the ammonia cracking catalyst 19, the cracked gas is generated. Then, the thus generated cracked gas is sent to the combustor 13.

Next, in Step S203, the controller 18 stops a heater 17a of the ammonia autothermal cracking device 17. Next, in Step S204, the controller 18 stops the supply of air to the ammonia autothermal cracking device 17. Specifically, the controller 18 closes the air flow rate control valve 301. Then, in Step S205, the controller 18 stops the supply of ammonia to the ammonia autothermal cracking device 17. Specifically, the controller 18 closes the second flow rate control valve 202.

Subsequently to Step S205 or when it is determined as NO in Step S201, the processing proceeds to Step S104 in which the controller 18 determines whether or not an input heat quantity to the combustor 13 has exceeded a reference heat quantity. When it is determined as YES in Step S104, the processing proceeds to Step S105 as in the processing flow illustrated in FIG. 2. Meanwhile, when it is determined as NO in Step S104, the processing returns to Step S201.

As described above, in the gas turbine system 1A, not only the ammonia autothermal cracking device 17 but also the ammonia cracking catalyst 19 is provided. As a result, at the time of activation of the gas turbine system 1A, a method of generating the cracked gas to be supplied to the combustor 13 can be switched from a method of using the ammonia autothermal cracking device 17 to a method of using the ammonia cracking catalyst 19. Before the temperature of the ammonia cracking catalyst 19 reaches the reference temperature, the cracked gas is generated by using the ammonia autothermal cracking device 17. After the temperature of the ammonia cracking catalyst 19 reaches the reference temperature, the cracked gas is generated by using the ammonia cracking catalyst 19. Hence, after the temperature of the ammonia cracking catalyst 19 reaches the reference temperature, the cracked gas can be generated by effectively using heat of the air flowing through the intake flow passage 101. Thus, energy consumed for the supply of air to the ammonia autothermal cracking device 17 and energy consumed for driving of the heater 17a can be reduced.

Figure 5:
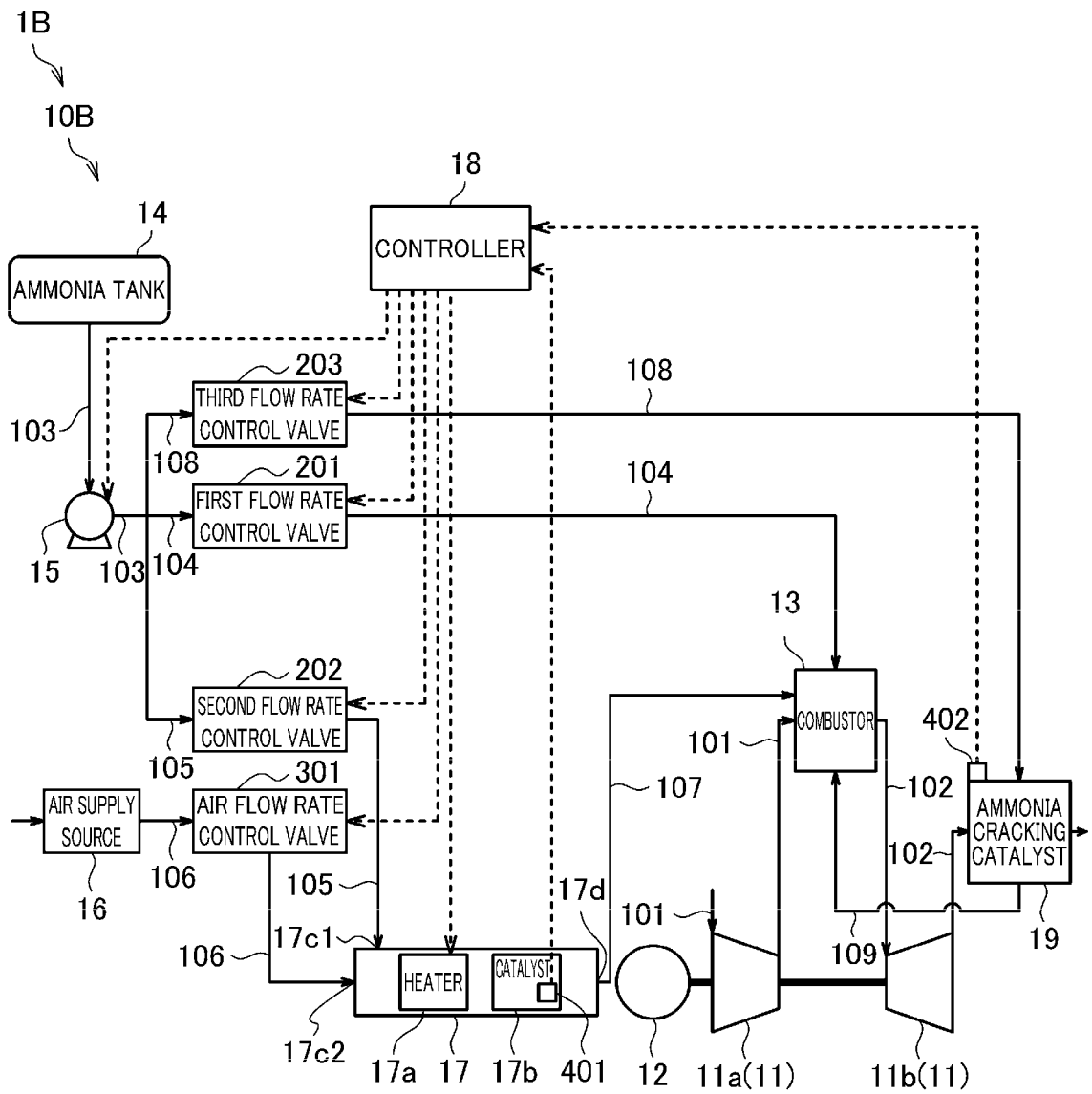
FIG. 5 is a schematic view for illustrating a configuration of a gas turbine system according to a second modification example.

FIG. 5 is a schematic view for illustrating a configuration of a gas turbine system 1B according to a second modification example. As illustrated in FIG. 2, the gas turbine system 1B according to the second modification example is different from the gas turbine system 1A described above in arrangement of an ammonia cracking catalyst 19.

In the second modification example, a combustor 13, an ammonia tank 14, a pump 15, an air supply source 16, an ammonia autothermal cracking device 17, a controller 18, the ammonia cracking catalyst 19, a first flow rate control valve 201, a second flow rate control valve 202, a third flow rate control valve 203, and an air flow rate control valve 301 of the gas turbine system 1B are included in a combustion device 10B.

As in the gas turbine system 1A described above, the ammonia cracking catalyst 19 is connected to the ammonia tank 14 through intermediation of a flow passage 103 and a flow passage 108. The ammonia cracking catalyst 19 is connected to the combustor 13 through intermediation of a flow passage 109.

The gas turbine system 1B is different from the gas turbine system 1A described above in that the ammonia cracking catalyst 19 is provided in an exhaust flow passage 102. Specifically, the ammonia cracking catalyst 19 is provided on a downstream side of a turbine 11b in the exhaust flow passage 102. The ammonia cracking catalyst 19 and an exhaust gas in the exhaust flow passage 102 can exchange heat under a state in which an internal space of the ammonia cracking catalyst 19 and the exhaust flow passage 102 are not in communication with each other. The exhaust gas flowing through the exhaust flow passage 102 has a high temperature (for example, 550° C. or higher). Hence, the ammonia cracking catalyst 19 is heated with the exhaust gas flowing through the exhaust flow passage 102 to a temperature around which the cracking of ammonia actively occurs during an operation of the gas turbine system 1B.

As described above, as in the gas turbine system 1A described above, in the gas turbine system 1B, not only the ammonia autothermal cracking device 17 but also the ammonia cracking catalyst 19 is provided. As a result, at the time of activation of the gas turbine system 1B, a method of generating the cracked gas to be supplied to the combustor 13 can be switched from a method of using the ammonia autothermal cracking device 17 to a method of using the ammonia cracking catalyst 19. Hence, after the temperature of the ammonia cracking catalyst 19 reaches the reference temperature, the cracked gas can be generated by effectively using heat of the exhaust gas flowing through the exhaust flow passage 102. Thus, energy consumed for the supply of air to the ammonia autothermal cracking device 17 and energy consumed for driving of the heater 17a can be reduced.

Processing associated with activation of the gas turbine system 1B is similar to the processing associated with the above-mentioned activation of the gas turbine system 1A, and thus description thereof is omitted.

Figure 6:
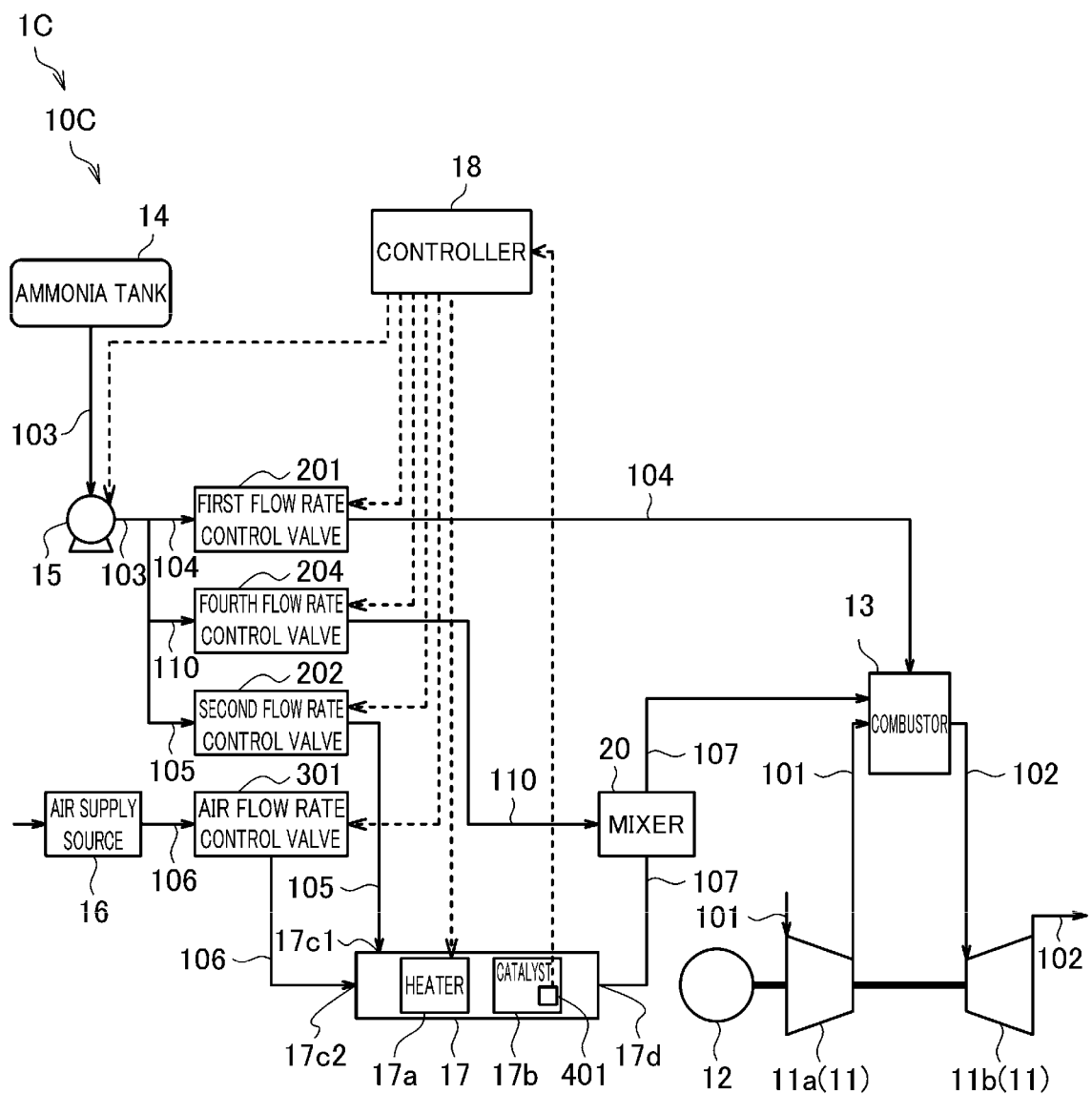
FIG. 6 is a schematic view for illustrating a configuration of a gas turbine system according to a third modification example.

FIG. 6 is a schematic view for illustrating a configuration of a gas turbine system 1C according to a third modification example. As illustrated in FIG. 6, the gas turbine system 1C according to the third modification example is different from the gas turbine system 1 described above in that a mixer 20 is further provided.

In the third modification example, a combustor 13, an ammonia tank 14, a pump 15, an air supply source 16, an ammonia autothermal cracking device 17, a controller 18, the mixer 20, a first flow rate control valve 201, a second flow rate control valve 202, and an air flow rate control valve 301 of the gas turbine system 1C are included in a combustion device 10C. A fourth flow rate control valve 204, which is described later, is also included in the combustion device 10C.

Various kinds of fluids are mixed in the mixer 20 as described later. The mixer 20 is provided in a flow passage 107 that connects the ammonia autothermal cracking device 17 and the combustor 13 to each other. An internal space of the mixer 20 is in communication with the flow passage 107. The mixer 20 is connected to the ammonia tank 14 through intermediation of a flow passage 103 and a flow passage 110. The flow passage 110 is connected to a downstream-side end portion of the flow passage 103. Liquid ammonia is supplied from the ammonia tank 14 to the mixer 20 via the flow passage 103 and the flow passage 110.

The fourth flow rate control valve 204 is provided in the flow passage 110. The fourth flow rate control valve 204 controls a flow rate of ammonia flowing through the flow passage 110. Specifically, the fourth flow rate control valve 204 adjusts a supply amount of ammonia from the ammonia tank 14 to the mixer 20. The supply amount of ammonia from the ammonia tank 14 to the mixer 20 is adjusted through adjustment of an opening degree of the fourth flow rate control valve 204.

The ammonia sent from the ammonia tank 14 to the mixer 20 is sprayed into the mixer 20. Then, a cracked gas flowing through the flow passage 107 and the ammonia sprayed into the mixer 20 are mixed in the mixer 20. The cracked gas flowing through the flow passage 107 has a high temperature (for example, about 500° C.). Hence, the ammonia sprayed into the mixer 20 is vaporized. The vaporized ammonia is sent together with the cracked gas to the combustor 13 through the flow passage 107.

Figure 7:
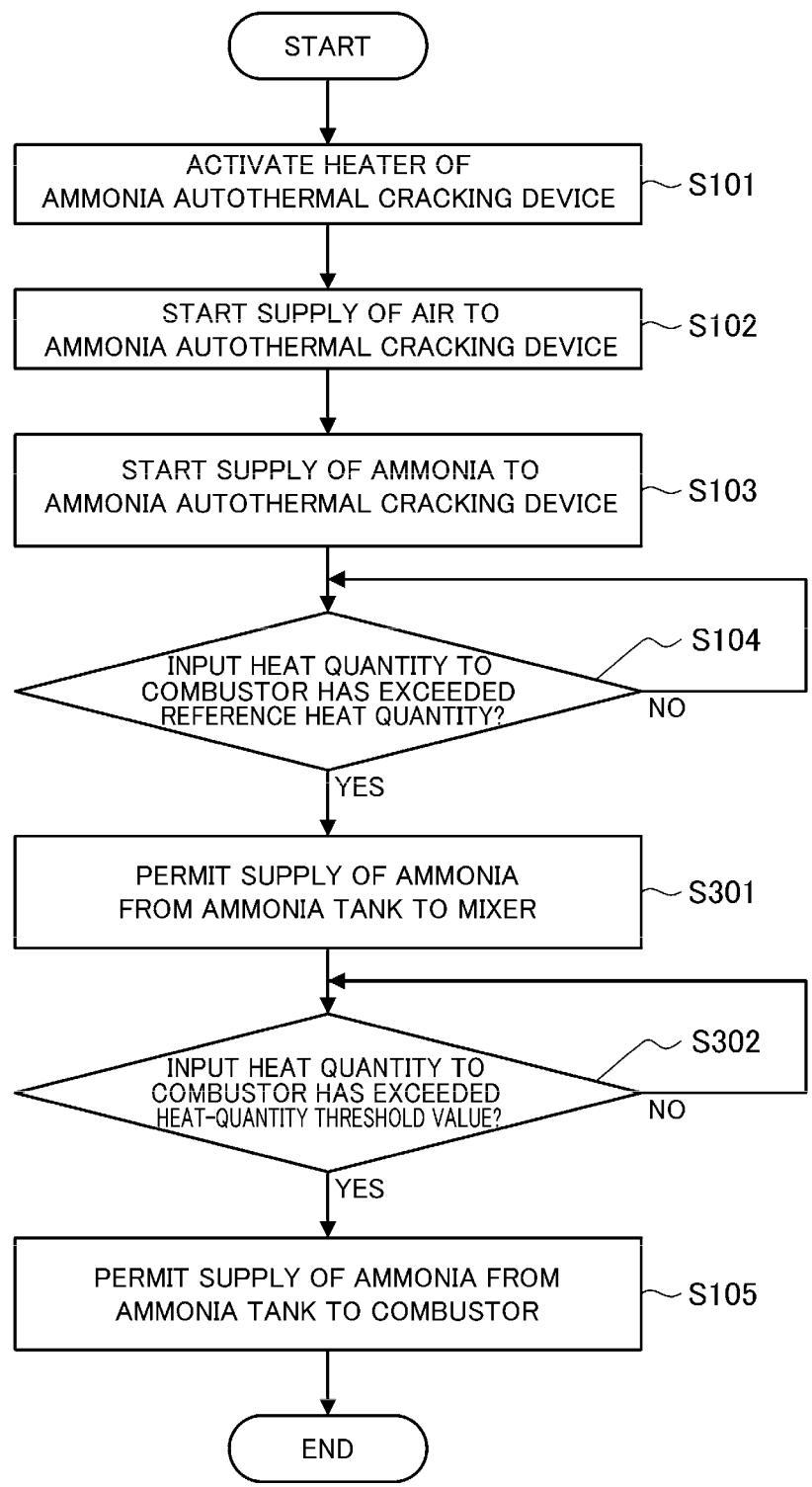
FIG. 7 is a flowchart for illustrating one example of flow of processing associated with activation of the gas turbine system according to the third modification example.

FIG. 7 is a flowchart for illustrating one example of flow of processing associated with activation of the gas turbine system 1C. The processing flow illustrated in FIG. 7 is performed by the controller 18. As in the processing flow illustrated in FIG. 2, the processing flow illustrated in FIG. 7 is executed when an activation condition for the gas turbine system 1C is satisfied.

The processing flow illustrated in FIG. 7 is different from the processing flow illustrated in FIG. 2 in that Steps S301 and S302 are added between Step S104 and Step S105.

In the processing flow illustrated in FIG. 7, when it is determined in Step S104 that an input heat quantity to the combustor 13 has exceeded a reference heat quantity (YES in Step S104), the processing proceeds to Step S301. In Step S301, the controller 18 permits the supply of ammonia from the ammonia tank 14 to the mixer 20. Specifically, in Step S301, when a required output for the gas turbine system 1 is equal to or larger than a reference output, the controller 18 starts the supply of ammonia from the ammonia tank 14 to the mixer 20. In this case, the controller 18 opens the fourth flow rate control valve 204 that is in a closed state. As a result, ammonia is sent together with the cracked gas from the mixer 20 to the combustor 13. Hence, combustion using ammonia as fuel is started. When the required output for the gas turbine system 1 is smaller than the reference output, the supply of ammonia from the ammonia tank 14 to the mixer 20 is not required.

As described above, the ammonia sent from the mixer 20 to the combustor 13 is heated with the cracked gas and is vaporized. Hence, evaporation of ammonia in the combustor 13, which may occur when liquid ammonia is directly supplied to the combustor 13, is suppressed, and thus a decrease in temperature, which may locally occur due to the evaporation of ammonia, is suppressed. Accordingly, discharge of non-combusted ammonia and nitrous oxide ($N_2O$) is suppressed.

Next, in Step S302, the controller 18 determines whether or not the input heat quantity to the combustor 13 has exceeded a heat-quantity threshold value. The heat-quantity threshold value is an index for determining that the input heat quantity is large enough to suppress the discharge of non-combusted ammonia and nitrous oxide ($N_2O$) even after the supply of liquid ammonia to the combustor 13 is started.

When it is determined that the input heat quantity to the combustor 13 has exceeded the heat-quantity threshold value (YES in Step S302), the controller 18 determines that the input heat quantity is large enough to suppress the discharge of non-combusted ammonia and nitrous oxide ($N_2O$) even after the supply of liquid ammonia to the combustor 13 is started. Then, the processing proceeds to Step S105. In Step S105, the controller 18 permits the supply of liquid ammonia from the ammonia tank 14 to the combustor 13. Then, the processing flow illustrated in FIG. 7 ends. Meanwhile, when it is determined that the input heat quantity to the combustor 13 has not exceeded the heat-quantity threshold value (NO in Step S302), the controller 18 determines that a certain amount of non-combusted ammonia and nitrous oxide ($N_2O$) is generated after the supply of liquid ammonia to the combustor 13 is started. Then, Step S302 is repeated.

As described above, in the gas turbine system 1C, the mixer 20 is provided in the flow passage 107 that connects the ammonia autothermal cracking device 17 and the combustor 13 to each other, and the mixer 20 is connected to the ammonia tank 14. Thus, liquid ammonia can be heated with the cracked gas and be vaporized in the mixer 20. Hence, the vaporized ammonia can be sent from the mixer 20 to the combustor 13 before the input heat quantity to the combustor 13 reaches the heat-quantity threshold value. Thus, the evaporation of ammonia in the combustor 13 is suppressed, and the discharge of non-combusted ammonia and nitrous oxide ($N_2O$) is suppressed.

Figure 8:
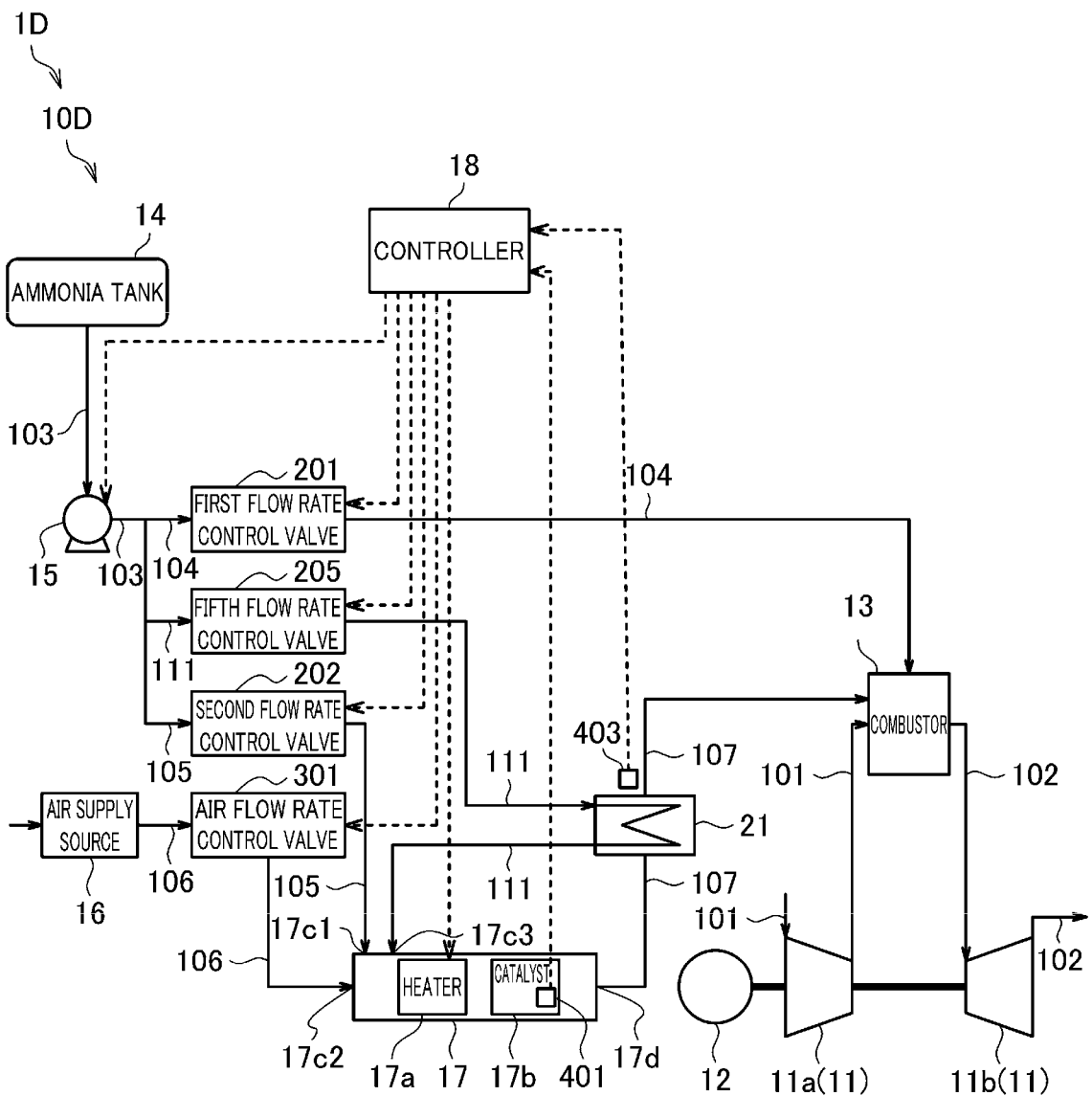
FIG. 8 is a schematic view for illustrating a configuration of a gas turbine system according to a fourth modification example.

FIG. 8 is a schematic view for illustrating a configuration of a gas turbine system 1D according to a fourth modification example. As illustrated in FIG. 8, the gas turbine system 1D according to the fourth modification example is different from the gas turbine system 1 described above in that a first heat exchanger 21 is further provided.

In the fourth modification example, a combustor 13, an ammonia tank 14, a pump 15, an air supply source 16, an ammonia autothermal cracking device 17, a controller 18, the first heat exchanger 21, a first flow rate control valve 201, a second flow rate control valve 202, and an air flow rate control valve 301 of the gas turbine system 1D are included in a combustion device 10D. A fifth flow rate control valve 205, which is described later, is also included in the combustion device 10D.

In the gas turbine system 1D, a flow passage 111 is provided in addition to a flow passage 105 as flow passages that connect the ammonia tank 14 and the ammonia autothermal cracking device 17 to each other. Specifically, the flow passage 111 is connected to a downstream-side end portion of a flow passage 103. The flow passage 111 is connected to an inlet 17c3 of the ammonia autothermal cracking device 17. Hence, ammonia can be supplied from the ammonia tank 14 to the inlet 17c3 of the ammonia autothermal cracking device 17 via the flow passage 103 and the flow passage 111. Hereinafter, the flow passage 111 is also referred to as "first flow passage 111". The flow passage 105 is also referred to as "second flow passage 105".

The fifth flow rate control valve 205 is provided in the first flow passage 111. The fifth flow rate control valve 205 controls a flow rate of ammonia flowing through the flow passage 111. Specifically, the fifth flow rate control valve 205 adjusts a supply amount of ammonia which is to be supplied from the ammonia tank 14 through the first flow passage 111 to the ammonia autothermal cracking device 17. When an opening degree of the fifth flow rate control valve 205 is adjusted, the supply amount of ammonia to be supplied from the ammonia tank 14 through the first flow passage 111 to the ammonia autothermal cracking device 17 is adjusted.

The first flow passage 111 passes through the first heat exchanger 21. Specifically, part of the first flow passage 111, which is located on a downstream side of the fifth flow rate control valve 205, passes through the first heat exchanger 21. The first heat exchanger 21 is provided in a flow passage 107 that connects the ammonia autothermal cracking device 17 and the combustor 13 to each other. That is, ammonia in the first flow passage 111 and a cracked gas in the flow passage 107 can exchange heat. Liquid ammonia flowing through the first flow passage 111 is heated with the cracked gas and is vaporized in the first heat exchanger 21. Then, the vaporized ammonia is sent to the inlet 17c3 of the ammonia autothermal cracking device 17 through the first flow passage 111. A nozzle that sprays gaseous ammonia is provided at the inlet 17c3. Ammonia is sprayed from the nozzle into the ammonia autothermal cracking device 17.

Meanwhile, the second flow passage 105 bypasses the first heat exchanger 21. Specifically, the second flow passage 105 does not pass through the first heat exchanger 21. Hence, the liquid ammonia is sent to the inlet 17c1 of the ammonia autothermal cracking device 17 through the second flow passage 105. As described above, a nozzle that sprays liquid ammonia is provided at the inlet 17c1. Ammonia is sprayed from the nozzle into the ammonia autothermal cracking device 17.

A temperature sensor 403 is provided on a downstream side of the first heat exchanger 21 in the flow passage 107. The temperature sensor 403 detects a temperature of the cracked gas on the downstream side of the first heat exchanger 21 in the flow passage 107. The temperature sensor 403 is arranged, for example, in the vicinity of the first heat exchanger 21.

Figure 9:
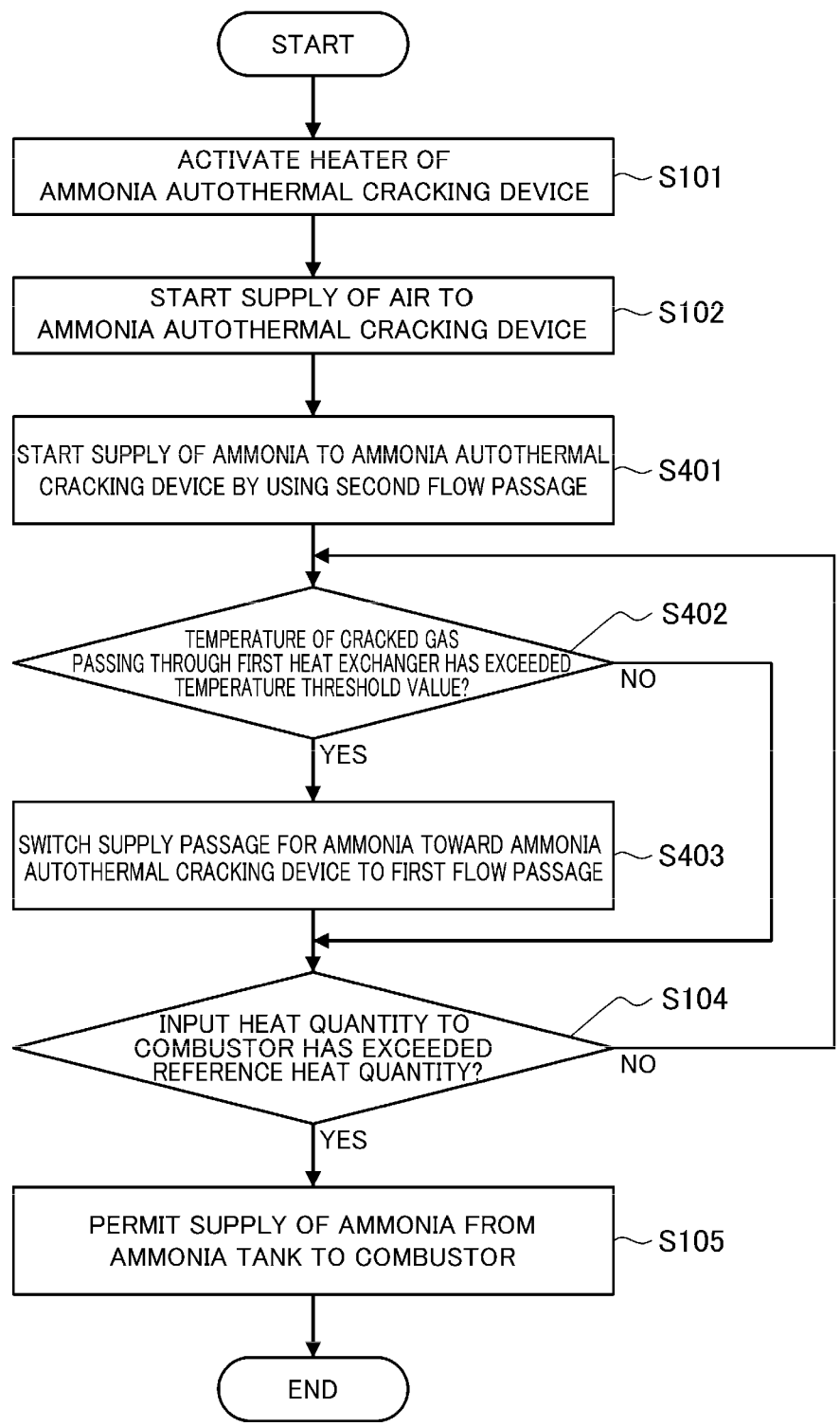
FIG. 9 is a flowchart for illustrating one example of flow of processing associated with activation of the gas turbine system according to the fourth modification example.

FIG. 9 is a flowchart for illustrating one example of flow of processing associated with activation of the gas turbine system 1D. The processing flow illustrated in FIG. 9 is performed by the controller 18. As in the processing flow illustrated in FIG. 2, the processing flow illustrated in FIG. 9 is executed when an activation condition for the gas turbine system 1D is satisfied.

The processing flow illustrated in FIG. 9 is different from the processing flow illustrated in FIG. 2 in that Step S103 is omitted and Steps S401, S402, and S403 are added between Step S102 and Step S104.

In the processing flow illustrated in FIG. 9, in Step S401 subsequent to Step S102, the controller 18 starts the supply of ammonia to the ammonia autothermal cracking device 17 by using the second flow passage 105. Specifically, the controller 18 drives the pump 15 and opens the second flow rate control valve 202 that is in a closed state. As a result, liquid ammonia is sent to the ammonia autothermal cracking device 17 through the second flow passage 105 and is supplied from the inlet 17c1 of the ammonia autothermal cracking device 17 into the ammonia autothermal cracking device 17. Hence, a cracked gas is generated in the ammonia autothermal cracking device 17. Then, the thus generated cracked gas is sent to the combustor 13.

Next, in Step S402, the controller 18 determines whether or not a temperature of the cracked gas passing through the first heat exchanger 21 has exceeded a temperature threshold value. The temperature threshold value is an index for determining that the temperature of the cracked gas is high enough to vaporize ammonia in the first heat exchanger 21. For example, a result of detection performed by the temperature sensor 403 is used as the temperature of the cracked gas passing through the first heat exchanger 21.

When it is determined that the temperature of the cracked gas passing through the first heat exchanger 21 has exceeded the temperature threshold value (YES in Step S402), the controller 18 determines that the temperature of the cracked gas is high enough to vaporize ammonia in the first heat exchanger 21. Then, the processing proceeds to Step S403. Meanwhile, when it is determined that the temperature of the cracked gas passing through the first heat exchanger 21 has not exceeded the temperature threshold value (NO in Step S402), Step S403 is skipped and the processing proceeds to Step S104.

When it is determined as YES in Step S402, in Step S403, the controller 18 switches a supply passage for ammonia toward the ammonia autothermal cracking device 17 to the first flow passage 111. Specifically, the controller 18 closes the second flow rate control valve 202 and opens the fifth flow rate control valve 205 that is in a closed state. Thus, liquid ammonia is sent from the ammonia tank 14 to the first flow passage 111, and is heated with the cracked gas and vaporized in the first heat exchanger 21. Then, the vaporized ammonia is sent to the ammonia autothermal cracking device 17 through the first flow passage 111 and is supplied from the inlet 17c3 into the ammonia autothermal cracking device 17.

Subsequently to Step S403 or when it is determined as NO in Step S402, the processing proceeds to Step S104 in which the controller 18 determines whether or not an input heat quantity to the combustor 13 has exceeded a reference heat quantity. When it is determined as YES in Step S104, the processing proceeds to Step S105 as in the processing flow illustrated in FIG. 2. Meanwhile, when it is determined as NO in Step S104, the processing returns to Step S402.

As described above, in the gas turbine system 1D, the first heat exchanger 21 is provided in the flow passage 107 that connects the ammonia autothermal cracking device 17 and the combustor 13 to each other, and the first flow passage 111 passes through the first heat exchanger 21. Thus, liquid ammonia can be heated with the cracked gas and be vaporized in the first heat exchanger 21. Hence, after the temperature of the cracked gas passing through the first heat exchanger 21 exceeds the temperature threshold value, the vaporized ammonia can be supplied to the ammonia autothermal cracking device 17 via the first flow passage 111. Thus, ammonia can be combusted and cracked in the ammonia autothermal cracking device 17 without being vaporized. Accordingly, energy efficiency is improved because heat of vaporization for ammonia is not required in the reactions occurring in the ammonia autothermal cracking device 17.

The second flow passage 105 may be omitted from the configuration of the gas turbine system 1D. In this case, however, there arise two conditions in which liquid ammonia passes through the inlet 17c3 of the ammonia autothermal cracking device 17 and in which gaseous ammonia passes therethrough. Thus, regardless of whether a nozzle for spraying liquid is provided at the inlet 17c3 or a nozzle for spraying gas is provided at the inlet 17c3, a pressure loss in the first flow passage 111 increases. Meanwhile, the second flow passage 105 that bypasses the first heat exchanger 21 is further provided in the gas turbine system 1D. Hence, when liquid ammonia is supplied to the ammonia autothermal cracking device 17, ammonia is supplied from the nozzle for spaying liquid provided at the inlet 17c1 into the ammonia autothermal cracking device 17. When gaseous ammonia is supplied to the ammonia autothermal cracking device 17, ammonia is supplied from the nozzle for spaying gas provided at the inlet 17c3 into the ammonia autothermal cracking device 17. Thus, an increase in pressure loss in the first flow passage 111 is suppressed.

Figure 10:
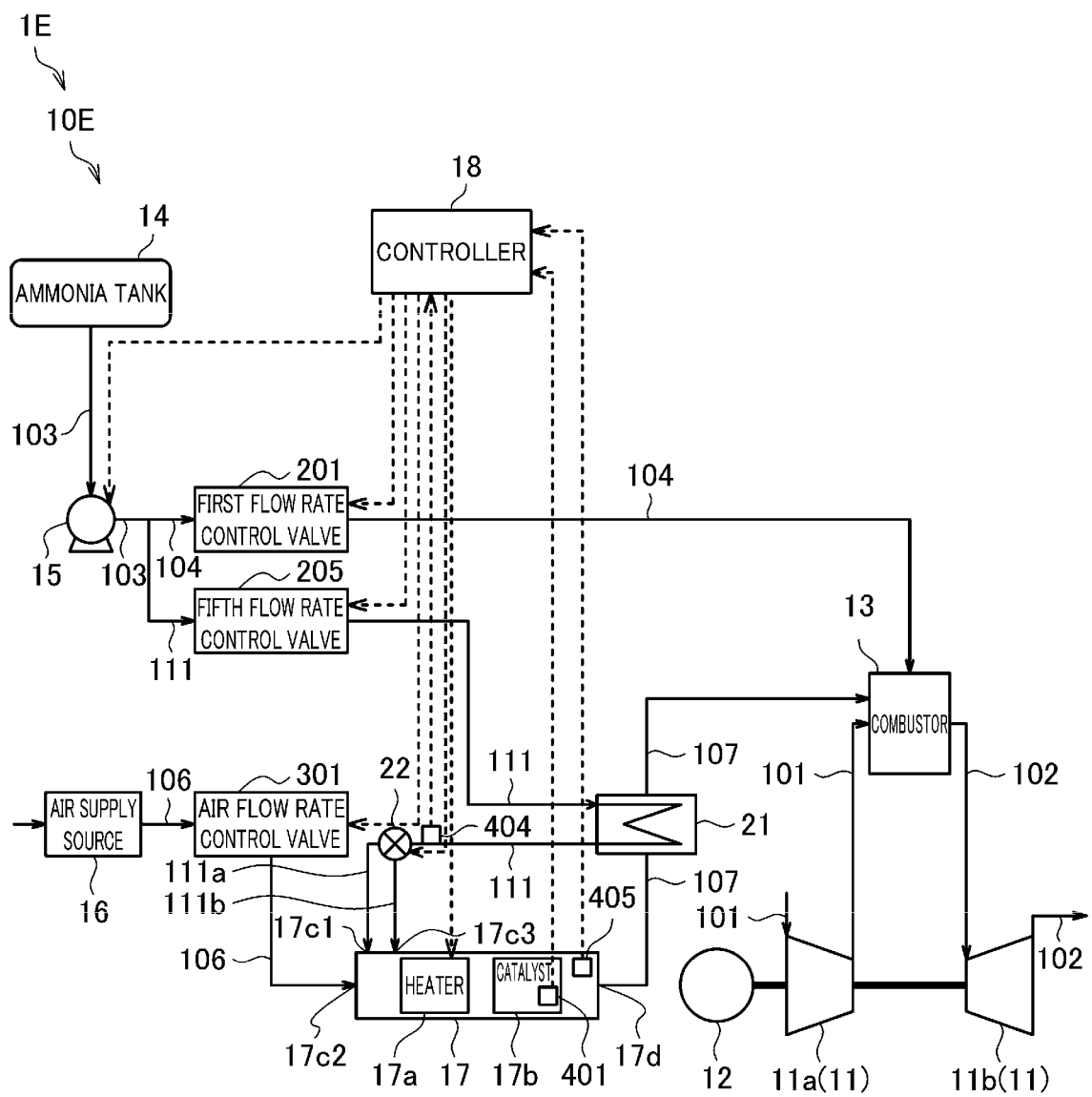
FIG. 10 is a schematic view for illustrating a configuration of a gas turbine system according to a fifth modification example.

FIG. 10 is a schematic view for illustrating a configuration of a gas turbine system 1E according to a fifth modification example. As illustrated in FIG. 10, the gas turbine system 1E according to the fifth modification example is different from the gas turbine system 1D described above in that the second flow passage 105 is omitted and a first flow passage 111 has branches.

In the first modification example, a combustor 13, an ammonia tank 14, a pump 15, an air supply source 16, an ammonia autothermal cracking device 17, a controller 18, a first heat exchanger 21, a first flow rate control valve 201, a fifth flow rate control valve 205, and an air flow rate control valve 301 of the gas turbine system 1E are included in a combustion device 10E. A switching valve 22, which is described later, is also included in the combustion device 10E.

In the gas turbine system 1E, the first flow passage 111 branches into a first branch passage 111a and a second branch passage 111b on a side closer to an ammonia autothermal cracking device 17 with respect to the first heat exchanger 21. The first branch passage 111a is connected to an inlet 17c1 of the ammonia autothermal cracking device 17. The second branch passage 111b is connected to an inlet 17c3 of the ammonia autothermal cracking device 17. Ammonia sent from the ammonia tank 14 to the first flow passage 111 is sent to the ammonia autothermal cracking device 17 through the first branch passage 111a or the second branch passage 111b.

The switching valve 22 that switches a supply passage for ammonia between the first branch passage 111a and the second branch passage 111b is provided in the first flow passage 111. The switching valve 22 is provided at a branch portion between the first branch passage 111a and the second branch passage 111b. The switching valve 22 is controlled by the controller 18.

A pressure sensor 404 is provided on an upstream side of the switching valve 22 in the first flow passage 111. The pressure sensor 404 detects a pressure on the upstream side of the switching valve 22 in the first flow passage 111. A pressure sensor 405 is provided in the ammonia autothermal cracking device 17. The pressure sensor 405 detects a pressure in the ammonia autothermal cracking device 17.

Figure 11:
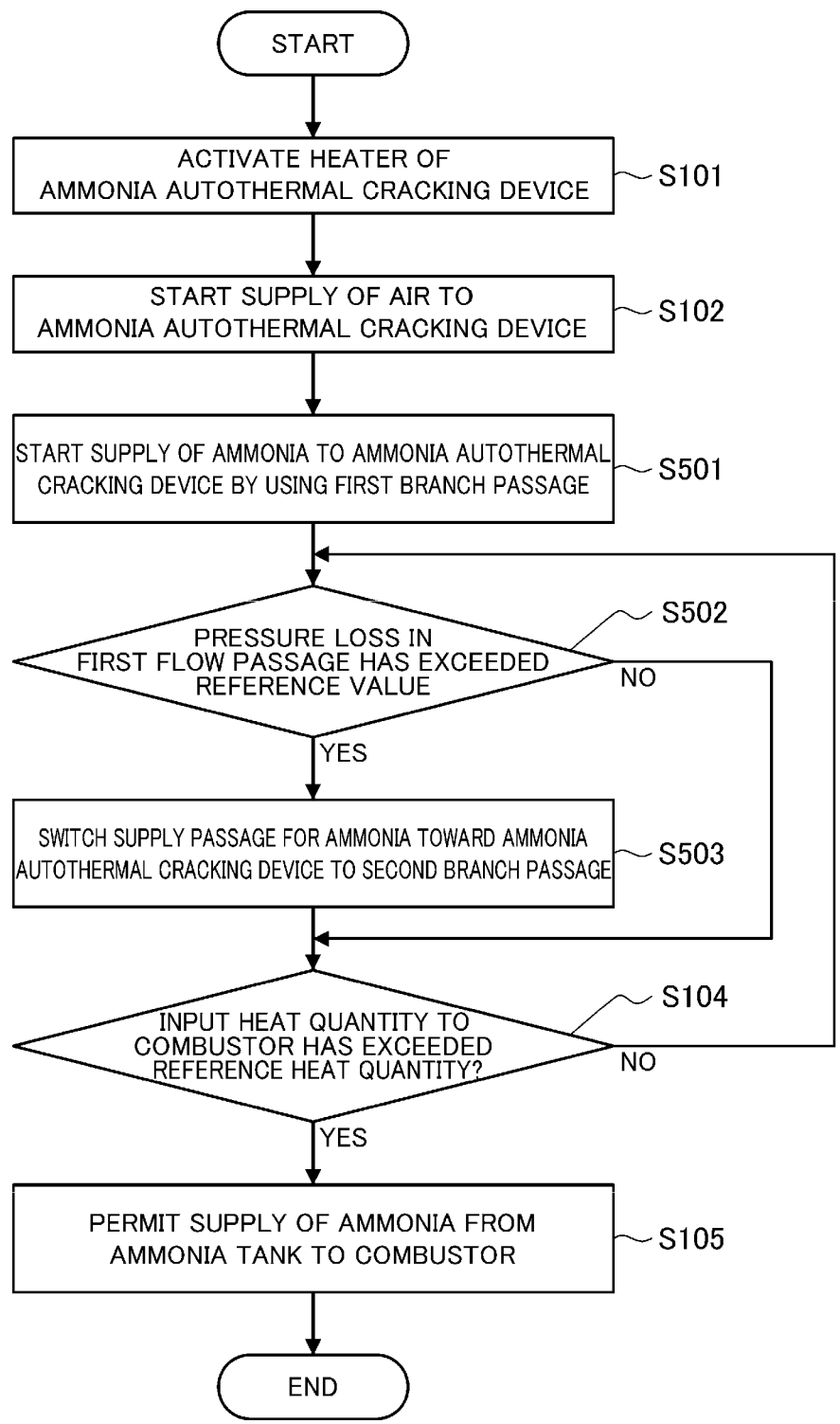
FIG. 11 is a flowchart for illustrating one example of flow of processing associated with activation of the gas turbine system according to the fifth modification example.

FIG. 11 is a flowchart for illustrating one example of flow of processing associated with activation of the gas turbine system 1E. The processing flow illustrated in FIG. 11 is performed by the controller 18. As in the processing flow illustrated in FIG. 2, the processing flow illustrated in FIG. 11 is executed when an activation condition for the gas turbine system 1E is satisfied.

The processing flow illustrated in FIG. 11 is different from the processing flow illustrated in FIG. 2 in that Step S103 is omitted and Steps S501, S502, and S503 are added between Step S102 and Step S104.

In the processing flow illustrated in FIG. 11, in Step S501 subsequent to Step S102, the controller 18 starts the supply of ammonia to the ammonia autothermal cracking device 17 by using the first branch passage 111a. Specifically, the controller 18 controls the switching valve 22 so that ammonia sent to the first flow passage 111 passes through the first branch passage 111a. The controller 18 drives the pump 15 and opens the fifth flow rate control valve 205 that is in a closed state. Thus, liquid ammonia is sent to the first flow passage 111. At this time, ammonia is not cracked in the ammonia autothermal cracking device 17, and thus ammonia passing through the first flow passage 111 is not heated in the first heat exchanger 21. In a certain time period after the cracking of ammonia is started in the ammonia autothermal cracking device 17, ammonia passing through the first flow passage 111 is not heated in the first heat exchanger 21 to such a degree that ammonia is vaporized.

Then, liquid ammonia is sent to the ammonia autothermal cracking device 17 through the first branch passage 111a and is supplied from the inlet 17c1 of the ammonia autothermal cracking device 17 into the ammonia autothermal cracking device 17. Hence, a cracked gas is generated in the ammonia autothermal cracking device 17. Then, the thus generated cracked gas is sent to the combustor 13.

Next, in Step S502, the controller 18 determines whether or not a pressure loss in the first flow passage 111 has exceeded a reference value. The controller 18 can estimate the pressure loss in the first flow passage 111 based on, for example, a difference between a pressure on an upstream side of the switching valve 22 in the first flow passage 111 and a pressure in the ammonia autothermal cracking device 17. For the estimation of the pressure loss in the first flow passage 111, for example, a pressure in the combustor 13 may be used in place of the pressure in the ammonia autothermal cracking device 17. The reference value is an index for determining that a temperature of the cracked gas is high enough to vaporize ammonia in the first heat exchanger 21. A nozzle for spraying liquid is provided at the inlet 17c1 connected to the first branch passage 111a. Thus, after ammonia is heated with the cracked gas and is vaporized in the first heat exchanger 21, the pressure loss in the first flow passage 111 increases. Hence, when the pressure loss in the first flow passage 111 exceeds the reference value, the controller 18 can determine that the temperature of the cracked gas is high enough to vaporize ammonia in the first heat exchanger 21.

When it is determined that the pressure loss in the first flow passage 111 has exceeded the reference value (YES in Step S502), the controller 18 determines that the temperature of the cracked gas is high enough to vaporize ammonia in the first heat exchanger 21. Then, the processing proceeds to Step S503. Meanwhile, when it is determined that the pressure loss in the first flow passage 111 has not exceeded the reference value (NO in Step S502), Step S503 is skipped and the processing proceeds to Step S104.

When it is determined as YES in Step S502, in Step S503, the controller 18 switches a supply passage for ammonia toward the ammonia autothermal cracking device 17 to the second branch passage 111b. Specifically, the controller 18 controls the switching valve 22 so that ammonia sent to the first flow passage 111 passes through the second branch passage 111*b*. At this time, the ammonia passing through the first flow passage 111 is heated with the cracked gas and is vaporized in the first heat exchanger 21. Then, the vaporized ammonia is sent to the ammonia autothermal cracking device 17 through the second branch passage 111*b* and is supplied from the inlet 17*c*3 into the ammonia autothermal cracking device 17.

Subsequently to Step S503 or when it is determined as NO in Step S502, the processing proceeds to Step S104 in which the controller 18 determines whether or not an input heat quantity to the combustor 13 has exceeded a reference heat quantity. When it is determined as YES in Step S104, the processing proceeds to Step S105 as in the processing flow illustrated in FIG. 2. Meanwhile, when it is determined as NO in Step S104, the processing returns to Step S502.

As described above, in the gas turbine system 1E, the first heat exchanger 21 is provided in the flow passage 107 that connects the ammonia autothermal cracking device 17 and the combustor 13 to each other, and the first flow passage 111 passes through the first heat exchanger 21. Thus, as in the gas turbine system 1D described above, when the vaporized ammonia is supplied to the ammonia autothermal cracking device 17 via the first flow passage 111, energy efficiency can be improved because heat of vaporization for ammonia is not required in the reactions occurring in the ammonia autothermal cracking device 17.

In particular, in the gas turbine system 1E, the first flow passage 111 branches into the first branch passage 111*a* and the second branch passage 111*b*. The first branch passage 111*a* and the second branch passage 111*b* are connected to the inlets 17*c*1 and 17*c*3 of the ammonia autothermal cracking device 17, respectively. Hence, when liquid ammonia is supplied to the ammonia autothermal cracking device 17, ammonia is supplied from the nozzle for spaying liquid provided at the inlet 17*c*1 into the ammonia autothermal cracking device 17. When gaseous ammonia is supplied to the ammonia autothermal cracking device 17, ammonia is supplied from the nozzle for spaying gas provided at the inlet 17*c*3 into the ammonia autothermal cracking device 17. Thus, an increase in pressure loss in the first flow passage 111 is suppressed.

There has been described above an example in which the supply passage for ammonia through the first flow passage 111 is switched by the switching valve 22. However, the supply passage for ammonia through the first flow passage 111 may be switched by a mechanism other than the switching valve 22. For example, an on-off valve capable of opening and closing a flow passage may be provided to each of the first branch passage 111*a* and the second branch passage 111*b*. In this case, when the on-off valve for the first branch passage 111*a* is opened and the on-off valve for the second branch passage 111*b* is closed, the supply passage for ammonia through the first flow passage 111 is switched to the first branch passage 111*a*. When the on-off valve for the first branch passage 111*a* is closed and the on-off valve for the second branch passage 111*b* is opened, the supply passage for ammonia through the first flow passage 111 is switched to the second branch passage 111*b*.

Figure 12:
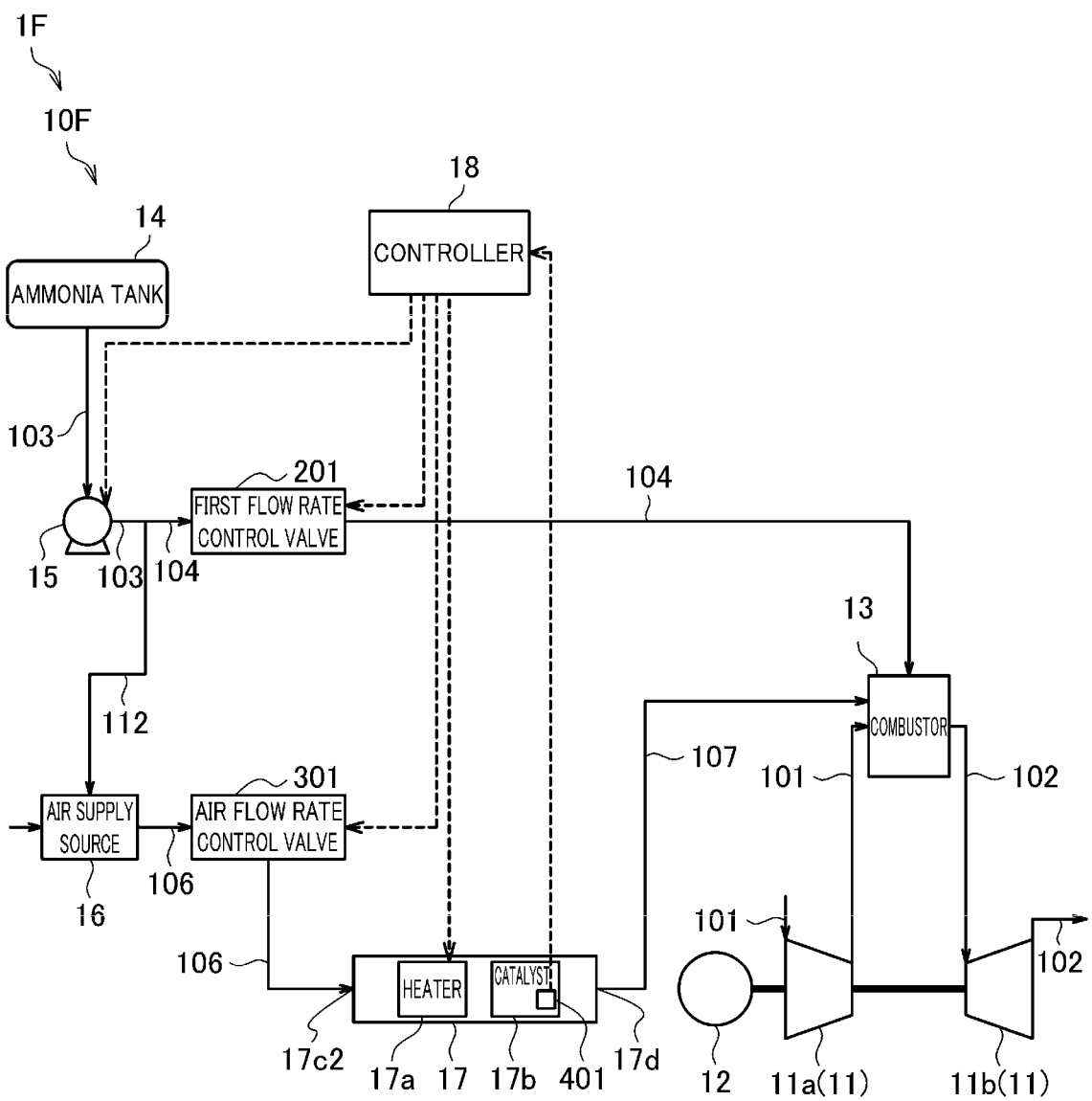
FIG. 12 is a schematic view for illustrating a configuration of a gas turbine system according to a sixth modification example.

FIG. 12 is a schematic view for illustrating a configuration of a gas turbine system 1F according to a sixth modification example. As illustrated in FIG. 12, the gas turbine system 1F according to the sixth modification example is different from the gas turbine system 1 described above in a connection relationship among an ammonia tank 14, an air supply source 16, and an ammonia autothermal cracking device 17.

In the sixth modification example, a combustor 13, an ammonia tank 14, a pump 15, an air supply source 16, an ammonia autothermal cracking device 17, a controller 18, a first flow rate control valve 201, and an air flow rate control valve 301 of the gas turbine system 1F are included in a combustion device 10F.

In the gas turbine system 1F, the ammonia tank 14 is connected to an inlet 17*c*2 of the ammonia autothermal cracking device 17 through intermediation of the air supply source 16. Specifically, the ammonia tank 14 is connected to the air supply source 16 through intermediation of a flow passage 103 and a flow passage 112. The flow passage 112 is connected to a downstream-side end portion of the flow passage 103. Liquid ammonia is supplied from the ammonia tank 14 to the air supply source 16 via the flow passage 103 and the flow passage 112. The ammonia supplied to the air supply source 16 is sent together with air to the ammonia autothermal cracking device 17 through a flow passage 106.

As described above, in the gas turbine system 1F, the ammonia tank 14 is connected to the inlet 17*c*2 of the ammonia autothermal cracking device 17 through intermediation of the air supply source 16. Thus, the air supply source 16 is cooled with ammonia supplied from the ammonia tank 14. For example, a plurality of compressors arranged in multiple stages are used as the air supply source 16 in some cases. In such cases, air flows in order through the plurality of compressors arranged in series. The multi-stage arrangement of the plurality of compressors can reduce compression power in each of the compressors. For example, the compressor in an intermediate stage is cooled with the ammonia supplied from the ammonia tank 14. The ammonia sent to the ammonia autothermal cracking device 17 is heated by the air supply source 16, and thus a heater 17*a* is not required in some cases.

Processing associated with activation of the gas turbine system 1F is substantially similar to the processing associated with the above-mentioned activation of the gas turbine system 1, and thus description thereof is omitted. However, the activation of the gas turbine system 1F is different from the activation of the gas turbine system 1 described above in that the supply of ammonia to the ammonia autothermal cracking device 17 is achieved by the air flow rate control valve 301.

Figure 13:
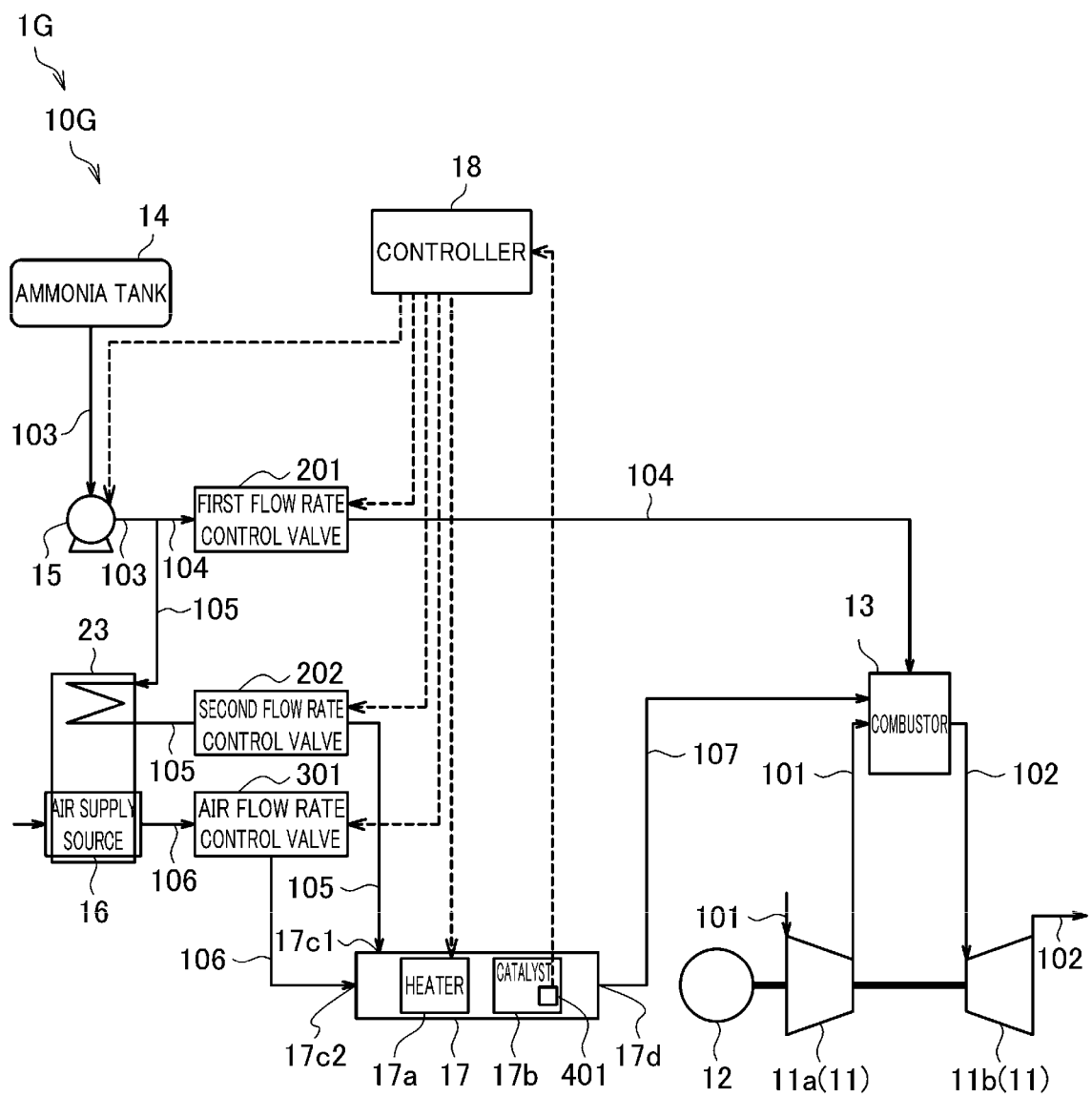
FIG. 13 is a schematic view for illustrating a configuration of a gas turbine system according to a seventh modification example.

FIG. 13 is a schematic view for illustrating a configuration of a gas turbine system 1G according to a seventh modification example. As illustrated in FIG. 13, the gas turbine system 1G according to the seventh modification example is different from the gas turbine system 1 described above in that a second heat exchanger 23 is further provided.

In the seventh modification example, a combustor 13, an ammonia tank 14, a pump 15, an air supply source 16, an ammonia autothermal cracking device 17, a controller 18, the second heat exchanger 23, a first flow rate control valve 201, a second flow rate control valve 202, and an air flow rate control valve 301 of the gas turbine system 1G are included in a combustion device 10F.

The second heat exchanger 23 is provided in the air supply source 16. A flow passage 105 that connects the ammonia tank 14 and the ammonia autothermal cracking device 17 to each other passes through the second heat exchanger 23. Ammonia in the flow passage 105 and the air supply source 16 can exchange heat under a state in which the flow passage 105 and an internal space of the air supply source 16 are not in communication with each other. Thus, in the gas turbine system 1G, the air supply source 16 is cooled with the ammonia flowing through the flow passage 105 in the second heat exchanger 23. As in the gas turbine system 1F described above, when a plurality of compressors arranged in multiple stages are used as the air supply source 16, for example, the compressor in an intermediate stage is cooled in the second heat exchanger 23. The ammonia sent to the ammonia autothermal cracking device 17 is heated by the air supply source 16, and thus a heater 17a is not required in some cases.

Processing associated with activation of the gas turbine system 1G is similar to the processing associated with the above-mentioned activation of the gas turbine system 1, and thus description thereof is omitted.

Figure 14:
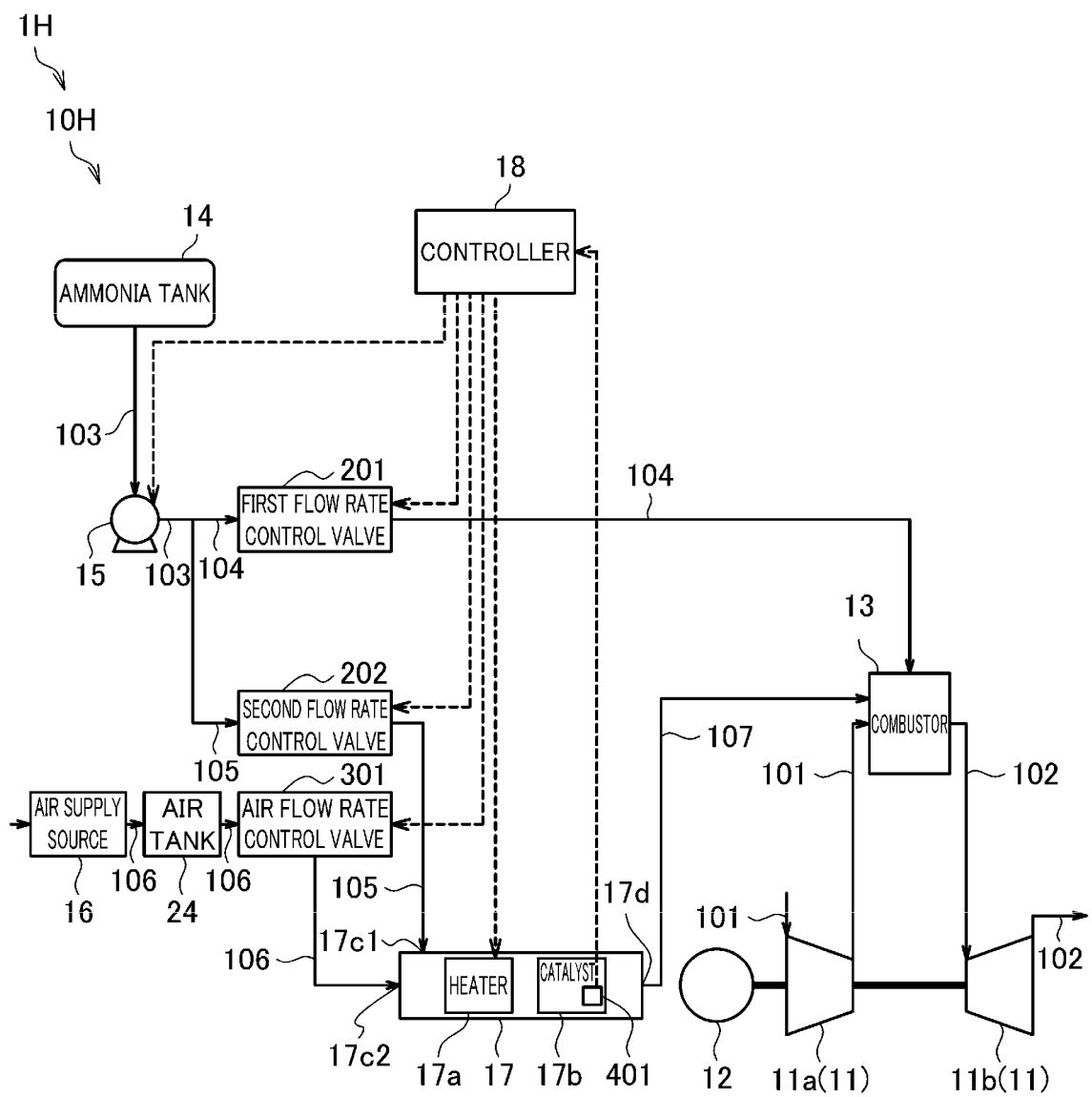
FIG. 14 is a schematic view for illustrating a configuration of a gas turbine system according to an eighth modification example.

FIG. 14 is a schematic view for illustrating a configuration of a gas turbine system 1H according to an eighth modification example. As illustrated in FIG. 14, the gas turbine system 1H according to the eighth modification example is different from the gas turbine system 1 described above in that an air tank 24 is further provided.

In the eighth modification example, a combustor 13, an ammonia tank 14, a pump 15, an air supply source 16, an ammonia autothermal cracking device 17, a controller 18, the air tank 24, a first flow rate control valve 201, a second flow rate control valve 202, and an air flow rate control valve 301 of the gas turbine system 1H are included in a combustion device 10H.

The air tank 24 stores air. The air tank 24 is provided on a downstream side of the air supply source 16 and an upstream side of the air flow rate control valve 301 in a flow passage 106. Specifically, the air supply source 16 is connected to an inlet 17c2 of the ammonia autothermal cracking device 17 through intermediation of the air tank 24. Thus, when the air supply source 16 is driven during an operation of the gas turbine system 1H, air can be stored in the air tank 24 in the gas turbine system 1H. Thus, for activation of the gas turbine system 1H, even when electric power for driving the air supply source 16 is insufficient due to, for example, a power failure, the gas turbine system 1H can be activated by using the air stored in the air tank 24.

Processing associated with activation of the gas turbine system 1H is similar to the processing associated with the above-mentioned activation of the gas turbine system 1, and thus description thereof is omitted.

The embodiment of the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

There have been described above examples in which the rotational power generated by the turbocharger 11 is used as energy for driving the power generator 12 in the gas turbine systems 1, 1A, 1B, 1C, 1D, 1E, 1F, 1G, and 1H. However, the rotational power generated by the turbocharger 11 in the gas turbine systems 1, 1A, 1B, 1C, 1D, 1E, 1F, 1G, and 1H may be used for other purposes of use (for example, for the purpose of driving a mobile body such as a vessel).

There have been described above examples in which the combustion devices 10, 10A, 10B, 10C, 10D, 10E, 10F, 10G, and 10H are used for a gas turbine system. However, the combustion devices 10, 10A, 10B, 10C, 10D, 10E, 10F, 10G, and 10H may be used for a device other than the gas turbine system (for example, an industrial furnace that uses energy recovered from exhaust heat or the like for combustion in a combustor).

There have been described above examples in which liquid ammonia is supplied to the combustor 13 and the ammonia autothermal cracking device 17 in the gas turbine systems 1, 1A, 1B, 1C, 1F, 1G, and 1H. However, gaseous ammonia may be supplied to the combustor 13 and the ammonia autothermal cracking device 17 in the gas turbine systems 1, 1A, 1B, 1C, 1F, 1G, and 1H. For example, a vaporizer may be provided on a downstream side of the pump 15 so that ammonia is supplied to the combustor 13 or the ammonia autothermal cracking device 17 after being vaporized by the vaporizer. In this case, an accumulator may be provided on a downstream side of the vaporizer. The vaporizer and the accumulator may be provided in the flow passage 103 or in each of the flow passages connected to the downstream-side end portion of the flow passage 103.

There have been described above the gas turbine systems 1A and 1B, each corresponding to the gas turbine system 1 in which the ammonia cracking catalyst 19 is additionally provided in the intake flow passage 101 or the exhaust flow passage 102. However, the ammonia cracking catalyst 19 may be additionally provided in the intake flow passage 101 or the exhaust flow passage 102 in the gas turbine systems 1C, 1D, 1E, 1F, 1G, and 1H.

There has been described above the gas turbine system 1C corresponding to the gas turbine system 1 in which the mixer 20 connected to the ammonia tank 14 is additionally provided. However, the mixer 20 connected to the ammonia tank 14 may be additionally provided in the gas turbine systems 1A, 1B, 1D, 1E, 1F, 1G, and 1H.

There have been described above the gas turbine systems 1D and 1E, each corresponding to the gas turbine system 1 in which the first heat exchanger 21 is additionally provided and at least the first flow passage 111 is provided as a flow passage that connects the ammonia tank 14 and the ammonia autothermal cracking device 17 to each other. However, the first heat exchanger 21 may be additionally provided and at least the first flow passage 111 may be provided as a flow passage that connects the ammonia tank 14 and the ammonia autothermal cracking device 17 to each other in the gas turbine systems 1A, 1B, 1C, 1F, 1G, and 1H.

There has been described above the gas turbine system 1F corresponding to the gas turbine system 1 in which the ammonia tank 14 is connected to the inlet 17c2 of the ammonia autothermal cracking device 17 through intermediation of the air supply source 16. However, the ammonia tank 14 may be connected to the inlet 17c2 of the ammonia autothermal cracking device 17 through intermediation of the air supply source 16 in the gas turbine systems 1A, 1B, 1C, 1D, 1E, and 1H.

There has been described above the gas turbine system 1G corresponding to the gas turbine system 1 in which the second heat exchanger 23 is additionally provided and the flow passage that connects the ammonia tank 14 and the ammonia autothermal cracking device 17 to each other passes through the second heat exchanger 23. However, the second heat exchanger 23 may be additionally provided and the flow passage that connects the ammonia tank 14 and the ammonia autothermal cracking device 17 to each other may pass through the second heat exchanger 23 in the gas turbine systems 1A, 1B, 1C, 1D, 1E, and 1H.

There has been described above the gas turbine system 1H corresponding to the gas turbine system 1 in which the air tank 24 is additionally provided. However, the air tank 24 may be additionally provided in the gas turbine systems 1A, 1B, 1C, 1D, 1E, 1F, and 1G.

The invention claimed is:

1. A combustion device, comprising:
an ammonia tank;
a combustor connected to the ammonia tank;
an air supply source;

an ammonia autothermal cracking device having inlets connected to the ammonia tank and the air supply source and an outlet connected to the combustor;

an intake flow passage and an exhaust flow passage, each being connected to the combustor; and an ammonia cracking catalyst, which is provided in the intake flow passage or the exhaust flow passage and is connected to the ammonia tank and the combustor.

2. The combustion device according to claim 1, wherein the ammonia tank is connected to the inlet of the ammonia autothermal cracking device through intermediation of the air supply source.

3. A gas turbine system, comprising the combustion device of claim 2.

4. The combustion device according to claim 1,
wherein a second heat exchanger is provided in the air supply source, and
wherein a flow passage that connects the ammonia tank and the ammonia autothermal cracking device to each other passes through the second heat exchanger.

5. A gas turbine system, comprising the combustion device of claim 4.

6. The combustion device according to claim 1, wherein the air supply source is connected to the inlet of the ammonia autothermal cracking device through intermediation of an air tank.

7. A gas turbine system, comprising the combustion device of claim 6.

8. A gas turbine system, comprising the combustion device of claim 1.

9. A combustion device, comprising:
an ammonia tank;
a combustor connected to the ammonia tank;
an air supply source; an
an ammonia autothermal cracking device having inlets connected to the ammonia tank and the air supply source and an outlet connected to the combustor,
wherein a mixer is provided in a flow passage that connects the ammonia autothermal cracking device and the combustor to each other, and
wherein the mixer is connected to the ammonia tank.

10. A gas turbine system, comprising the combustion device of claim 9.

11. A combustion device, comprising:
an ammonia tank;
a combustor connected to the ammonia tank;
an air supply source; an
an ammonia autothermal cracking device having inlets connected to the ammonia tank and the air supply source and an outlet connected to the combustor,
wherein a first heat exchanger is provided in a flow passage that connects the ammonia autothermal cracking device and the combustor to each other, and
wherein a flow passage that connects the ammonia tank and the ammonia autothermal cracking device to each other includes a first flow passage that passes through the first heat exchanger.

12. The combustion device according to claim 11,
wherein the flow passage that connects the ammonia tank and the ammonia autothermal cracking device to each other further includes a second flow passage that bypasses the first heat exchanger.

13. A gas turbine system, comprising the combustion device of claim 12.

14. The combustion device according to claim 11,
wherein the first flow passage branches into a first branch passage and a second branch passage on a side closer to the ammonia autothermal cracking device with respect to the first heat exchanger, and
wherein the first branch passage and the second branch passage are connected to the inlets of the ammonia autothermal cracking device, respectively.

15. A gas turbine system, comprising the combustion device of claim 14.

16. A gas turbine system, comprising the combustion device of claim 11.

* * * * *